(12) United States Patent
Wood et al.

(10) Patent No.: US 6,878,457 B2
(45) Date of Patent: Apr. 12, 2005

(54) REDUCING CONCENTRATION OF ORGANIC MATERIALS WITH SUBSTITUTED CYCLODEXTRIN COMPOUND IN POLYESTER PACKAGING MATERIALS

(75) Inventors: Willard E. Wood, Arden Hills, MN (US); Neil J. Beaverson, Vadnais Heights, MN (US); Phillip Lawonn, New Brighton, MN (US); Xiaoyan Huang, Spartanburg, SC (US)

(73) Assignee: Cellresin Technologies, LLC, Minneapolis, MN (US)

( * ) Notice: Subject to any disclaimer, the term of this patent is extended or adjusted under 35 U.S.C. 154(b) by 35 days.

(21) Appl. No.: 10/692,650

(22) Filed: Oct. 24, 2003

(65) Prior Publication Data

US 2004/0161602 A1 Aug. 19, 2004

Related U.S. Application Data

(62) Division of application No. 10/163,817, filed on Jun. 5, 2002, now Pat. No. 6,709,746.

(51) Int. Cl.[7] .......................... B32B 1/08; B32B 27/18; B32B 27/36
(52) U.S. Cl. ............... 428/542.8; 428/35.7; 428/36.92; 428/480; 524/107; 524/110; 524/48; 536/103
(58) Field of Search ............... 428/35.7, 36.92, 428/480, 542.8; 524/48, 107, 110, 366, 367, 379, 383; 536/102, 103, 111

(56) References Cited

U.S. PATENT DOCUMENTS

| 3,733,309 A | 5/1973 | Wyeth et al. |
| 3,740,258 A | 6/1973 | Waltes |
| 4,108,324 A | 8/1978 | Krishnakumar et al. |
| 4,127,633 A | 11/1978 | Addleman |
| 4,223,128 A | 9/1980 | Halek et al. |
| 4,318,489 A | 3/1982 | Snyder et al. |
| 4,334,627 A | 6/1982 | Krishnakumar et al. |
| 4,342,398 A | 8/1982 | Chang |
| 4,368,825 A | 1/1983 | Motill |
| 4,370,368 A | 1/1983 | Hirata et al. |
| 4,374,878 A | 2/1983 | Jakobsen et al. |
| 4,381,277 A | 4/1983 | Nilsson |

(Continued)

FOREIGN PATENT DOCUMENTS

| EP | 0 026 713 A2 | 4/1981 |
| EP | 0 455 370 B2 | 3/1997 |
| EP | 0 878 502 A2 | 11/1998 |

(Continued)

OTHER PUBLICATIONS

Aharoni, S., "The Cause of the Grey Discoloration of PET Prepared by the Use of Antimony–Catalysts," *Polymer Engineering and Science*, vol. 38, No. 7, pp. 1039–1047 (Jul. 1998).

(Continued)

*Primary Examiner*—Vivian Chen
(74) *Attorney, Agent, or Firm*—Merchant & Gould P.C.

(57) ABSTRACT

Volatile organic compound or other materials are produced in the thermoplastic manufacture of thermoplastic polyester beverage containers. Such materials can be eluted into beverages such as carbonated beverages, sparkling or still water from the polyester. Such thermoplastic polyester resins can be manufactured with a substituted cyclodextrin material that can prevent the formation of, or react with, and absorb volatile by-products during the formation of thermoplastic preforms or containers from the thermoplastic pellet or chip. Further, as the preform is blown into a polyester container, the active materials of the invention prevent the generation of additional undesirable volatile materials. Lastly, the scavenger material can act as a barrier that prevents transport of materials from the exterior of the container into the container contents.

16 Claims, 7 Drawing Sheets

Dimensions of cyclodextrins

U.S. PATENT DOCUMENTS

| | | | |
|---|---|---|---|
| 4,385,089 A | 5/1983 | Bonnebat et al. | |
| 4,391,971 A | 7/1983 | Massey et al. | |
| 4,393,106 A | 7/1983 | Maruhashi et al. | |
| 4,459,400 A | 7/1984 | Kuhfuss et al. | |
| 4,463,121 A | 7/1984 | Gartland et al. | |
| 4,473,515 A | 9/1984 | Ryder | |
| 4,482,586 A | 11/1984 | Smith et al. | |
| 4,615,914 A | 10/1986 | Walles | |
| 4,780,257 A | 10/1988 | Beck | |
| 4,837,115 A | 6/1989 | Igarashi et al. | |
| 4,850,494 A | 7/1989 | Howard, Jr. | |
| 5,258,233 A | 11/1993 | Mills et al. | |
| 5,266,416 A | 11/1993 | Inoue et al. | |
| 5,330,808 A | 7/1994 | Duff et al. | |
| 5,340,884 A | 8/1994 | Mills et al. | |
| 5,350,788 A | 9/1994 | Visioli et al. | |
| 5,362,784 A | 11/1994 | Brodie, III et al. | |
| 5,492,947 A * | 2/1996 | Wood et al. | 524/48 |
| 5,650,469 A | 7/1997 | Long et al. | |
| 5,776,842 A | 7/1998 | Wood et al. | |
| 5,814,714 A | 9/1998 | Palomo et al. | |
| 5,837,339 A * | 11/1998 | Wood et al. | 428/36.6 |
| 5,874,517 A | 2/1999 | Huang et al. | |
| 5,883,161 A * | 3/1999 | Wood et al. | 524/48 |
| 5,942,297 A | 8/1999 | Speer et al. | |
| 5,958,254 A | 9/1999 | Rooney | |
| 5,977,212 A | 11/1999 | Ebner et al. | |
| 6,007,885 A | 12/1999 | Hallock | |
| 6,042,908 A | 3/2000 | Long et al. | |
| 6,136,354 A | 10/2000 | Wood et al. | |
| 6,274,212 B1 | 8/2001 | Rule et al. | |
| 6,306,936 B1 * | 10/2001 | Wood et al. | 524/48 |
| 6,391,946 B2 * | 5/2002 | Wood et al. | 524/48 |
| 6,660,804 B1 * | 12/2003 | Weltrowski et al. | 525/54.23 |
| 6,790,499 B2 * | 9/2004 | Andrews et al. | 428/36.92 |
| 2002/0006991 A1 * | 1/2002 | Wood et al. | 524/48 |
| 2003/0004244 A1 | 1/2003 | Al-Malaika | |
| 2003/0113525 A1 * | 6/2003 | Beaverson et al. | 428/297.4 |
| 2003/0207056 A1 * | 11/2003 | Wood et al. | 428/35.7 |
| 2004/0110901 A1 * | 6/2004 | Wood et al. | 525/69 |
| 2004/0151856 A1 * | 8/2004 | Wood et al. | 428/35.7 |

FOREIGN PATENT DOCUMENTS

| | | |
|---|---|---|
| EP | 0 714 832 B1 | 5/1999 |
| JP | 57049620 A | 3/1982 |
| WO | WO 97/01427 | 1/1997 |
| WO | WO 97/28218 | 8/1997 |
| WO | WO 97/44376 | 11/1997 |
| WO | WO 98/12034 | 3/1998 |
| WO | WO 00/66659 | 11/2000 |
| WO | WO 01/00724 A1 | 1/2001 |
| WO | WO 01/02489 A1 | 1/2001 |

OTHER PUBLICATIONS

Antonopoulos, J., "Injection–Blow Molding," *Modern Plastics Encyclopeida,* vol. 61, No. 10A pp. 192–194 (Oct. 1984).

Bartle, K. et al., "Supercritical Fluid Extraction and Chromatography for the Determination of Oligomers in Poly(ethylene terephthalate) Films," *Anal. Chem.* vol. 63, No. 20, pp. 2371–2377 (Oct. 15, 1991).

Edge, M. et al., "Characterisation of the Species Responsible for Yellowing in Melt Degraded Aromatic Polyesters—I: Yellowing of Poly(ethylene Terephthalate)," *Polymer Degradation and Stability,* vol. 53, pp. 141–151 (1996).

"Richards Packaging Inc. and Duopac Packaging Inc. v. The Deputy Minister of National Revenue v. Eastman Chemical Canada Inc.," *Appeal Nos. AP–98–007 and AP–98–010,* http://www.citt.gc.ca/appeals/decision/ap98007e/ap98007e.htm, 10 pages (Feb. 10, 1999).

"Separation and Identification of Poly(ethylene Terephthalate) Oligomers by Gel Permeation Chromatography," *Journal of Polymer Science,* vol. 17, No. 12, pp. 4123–4127 (Dec. 1979).

* cited by examiner

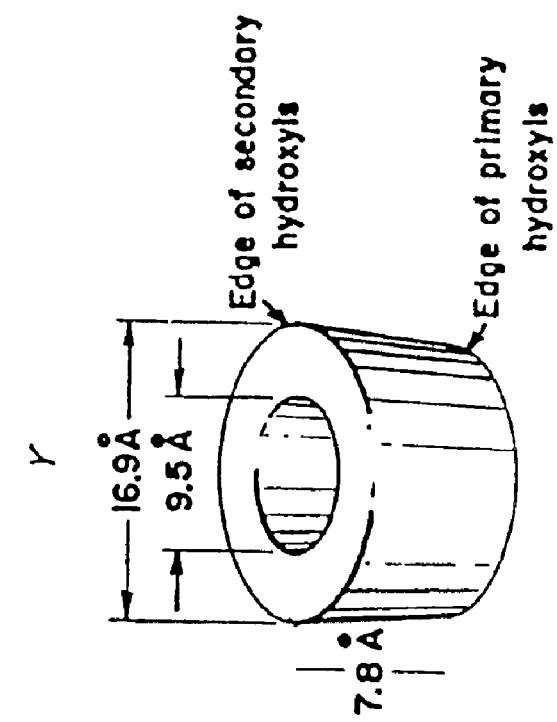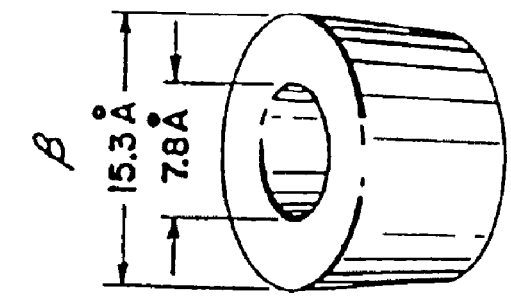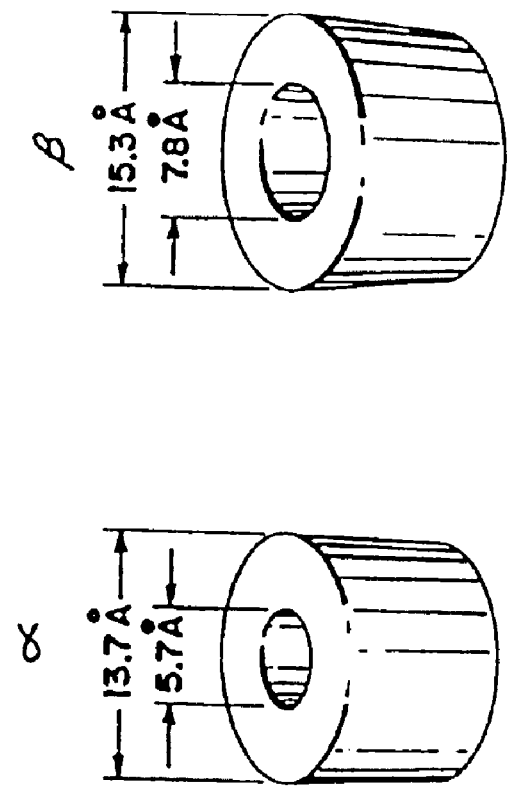

FIG. 4 ACETALDEHYDE REDUCTION IN PET USING SUBSTITUTED CYCLODEXTRINS AND LOW SPEED MIXING MIXING @ 40 RPM

REDUCING CONCENTRATION OF ORGANIC MATERIALS WITH SUBSTITUTED CYCLODEXTRIN COMPOUND IN POLYESTER PACKAGING MATERIALS

This Application is a divisional of application Ser. No. 10/163,817, filed Jun. 5, 2002, now U.S. Pat. No. 6,709,746.

FIELD OF THE INVENTION

Container structures can comprise an oriented thermoplastic polyester resin material. Such resins can be a source of reactive organic materials that can be eluted from the packaging into, for example, a food material held within the container. Such reactive materials, including an aldehyde material, can result in undesirable off-odors or off-flavors in a food, or off-taste in water or beverage drink. The invention relates to polyester pellet or chip coated with active materials that can prevent the formation of or scavenge the organic material during preform and bottle manufacturing methods. The invention further relates to the polyester preform comprising thermoplastic polyester and, dispersed in the thermoplastic resin, an active material that can act to prevent the formation of or scavenge volatile organic components. Lastly, the invention relates to a thermoplastic beverage container and methods of making the chip, preform or container.

BACKGROUND OF THE INVENTION

Polyethylene terephthalate (PET) packaging materials in the form of film, shaped containers, bottles, etc. have been known. Further, rigid, or semi-rigid, thermoplastic beverage containers have been made from preforms that are in turn molded from pellets or chips etc. Biaxially oriented blow molded thermoformed polyester beverage containers are disclosed in J. Agranoff (Ed) Modern Plastics, Encyclopedia, Vol. 16, No. 10A, P. (84) pp. 192–194. These beverage containers are typically made from a polyester, a product of a condensation polymerization. The polyester is typically made by reacting a dihydroxy compound and a diacid compound in a condensation reaction with a metallic catalyst. Dihydroxy compounds such as ethylene glycol, 1,4-butane diol, 1,4-cyclohexane diol and other diol can be copolymerized with an organic diacid compound or lower diester thereof such diacid. Such diacidic reactants include terephthalic acid, 2,6-naphthalene dicarboxylic acid, methyl diester thereof, etc. The condensation/polymerization reaction occurs between the dicarboxylic acid, or a dimethyl ester thereof and the glycol material in a heat driven metal catalyzed reaction that releases water or methanol as a reaction by-product leaving, a high molecular weight polyester material. Bulk resin is formed as a convenient flake, chip or pellet adapted for future thermal processing. Bulk polyester material can be injection blow molded directly into a container. Alternately, the polyester can be formed into an intermediate preform that can then be introduced into a blow-molding machine. The polyester is heated and blown to an appropriate shape and volume for a beverage container. The preform can be a single layer material, a bilayer or a multilayer preform.

Metallic catalysts are used to promote a polymerization reaction between diacid material and the dihydroxy compound. At the beginning of the melt phase, ethylene glycol, terephthalic acid, or ester thereof, and metallic catalysts are added to the reactor vessel. Various catalysts are known in the art to be suitable for the transesterification step. Salts of organic acids with bivalent metals (e.g. manganese, zinc, cobalt or calcium acetate) are preferably used as—direct esterification or trans-esterification catalysts, which in themselves also catalyze the polycondensation reaction. Antimony, germanium and titanium compounds are preferably used as polycondensate catalysts. Catalysts that may be used include organic and inorganic compounds of one or more metals alone or in combination with the above-described antimony, also including germanium and titanium. Suitable forms of antimony can be used, including inorganic antimony oxides, and organic compounds of antimony, such as antimony acetate, antimony oxalate, antimony glycoxide, antimony butoxide, and antimony dibutoxide. Antimony-containing compounds are currently in widespread commercial use as catalysts that provide a desirable combination of high reaction rate and low color formation. Titanium may be chosen from the group consisting of the following organic titanates and titanium complexes: titanium oxalate, titanium acetate, titanium butylate, titanium benzoate, titanium isoproprylate, and potassium titanyl oxalate. Organic titanates are not generally used in commercial production. At the end of the melt phase, after polymerization is complete and molecular weight is maximized, the product is pelletized. The pellets are treated in solid-state polycondensation to increase intrinsic viscosity in order to obtain bottle resin of sufficient strength. The catalysts typically comprise metallic divalent or trivalent cations. The treatment of polyester materials containing such catalysts can result in byproduct formation. Such byproduct can comprise reactive organic materials such as an aldehyde material, commonly analyzed as acetaldehyde. The formation of acetaldehyde materials can cause off odor or off taste in the beverage and can provide a yellowish cast to the plastic at high concentrations. Polyester manufacturers have added phosphorus-based additives as metal stabilizers to reduce acetaldehyde formation. Many attempts to reduce aldehyde formation have also caused problems. Antimony present as $Sb^{+1}$, $Sb^{+2}$ and $Sb^{+3}$ in the polyester as catalyst residues from manufacture can be reduced to antimony metal, $Sb^0$, by the additives used to prevent aldehyde formation or scavenge such materials. Formation of metallic antimony can cause a gray or black appearance to the plastic from the dispersed, finely divided metallic residue.

The high molecular weight thermoplastic polyester can contain a large variety of relatively low molecular weight compound, (i.e.) a molecular weight substantially less than 500 grams per mole as a result of the catalytic mechanism discussed above or from other sources. These compounds can be extractable into food, water or the beverage within the container. These beverage extractable materials typically comprise impurities in feed streams of the diol or diacid used in making the polyester. Further, the extractable materials can comprise by-products of the polymerization reaction, the preform molding process or the thermoforming blow molding process. The extractable materials can comprise reaction byproduct materials including formaldehyde, formic acid, acetaldehyde, acetic acid, 1,4-dioxane, 2-methyl-1,3-dioxolane, and other organic reactive aldehyde, ketone and acid products. Further, the extractable materials can contain residual diester, diol or diacid materials including methanol, ethylene glycol, terephthalic acid, dimethyl terephthalic, 2,6-naphthalene dicarboxylic acid and esters or ethers thereof. Relatively low molecular weight (compared to the polyester resin) oligomeric linear or cyclic diesters, triesters or higher esters made by reacting one mole of ethylene glycol with one mole of terephthalic acid may be present. These relatively low molecular oligomers can comprise two or more moles of diol combined with two or more moles of diacid. Schiono, *Journal of Polymer Science: Polymer Chemistry Edition*, Vol. 17, pp. 4123–4127 (1979), John Wiley & Sons, Inc. discusses the separation and identification of PET impurities comprising poly(ethylene terephthalate) oligomers by gel permeation chromatography. Bartl et al., "Supercritical Fluid Extraction and Chromatography for the Determination of Oligomers and Poly(ethylene terephthalate) Films", *Analytical Chemistry*, Vol. 63, No. 20, Oct. 15, 1991, pp. 2371–2377, discusses experimental supercritical fluid procedures for separation and identification of a lower oligomer impurity from polyethylene terephthalate films.

Foods or beverages containing these soluble/extractables derived from the container, can have a perceived off-taste, a changed taste or even, in some cases, reduced taste when consumed by a sensitive consumer. The extractable compounds can add to or interfere with the perception of either an aroma note or a flavor note from the beverage material. Additionally, some substantial concern exists with respect to the toxicity or carcinogenicity of any organic material that can be extracted into beverages for human consumption.

The technology relating to compositions used in the manufacture of beverage containers is rich and varied. In large part, the technology is related to coated and uncoated polyolefin containers and to coated and uncoated polyester that reduce the permeability of gasses such as carbon dioxide and oxygen, thus increasing shelf life. The art also relates to manufacturing methods and to bottle shape and bottom configuration. Deaf et al., U.S. Pat. No. 5,330,808 teaches the addition of a fluoroelastomer to a polyolefin bottle to introduce a glossy surface onto the bottle. Visioli et al., U.S. Pat. No. 5,350,788 teaches methods for reducing odors in recycled plastics. Visioli et al. disclose the use of nitrogen compounds including polyalkylenimine and polyethylenimine to act as odor scavengers in polyethylene materials containing a large proportion of recycled polymer. Wyeth et al., U.S. Pat. No. 3,733,309 show a blow molding machine that forms a layer of polyester that is blown in a blow mold. Addleman, U.S. Pat. No. 4,127,633 teaches polyethylene terephthalate preforms which are heated and coated with a polyvinylidene chloride copolymer latex that forms a vapor or gas barrier. Halek et al., U.S. Pat. No. 4,223,128 teaches a process for preparing polyethylene terephthalate polymers useful in beverage containers. Bonnebat et al., U.S. Pat. No. 4,385,089 teaches a process for preparing biaxially oriented, hollow thermoplastic shaped articles in bottles using a biaxial draw and blow molding technique. A preform is blow molded and then maintained in contact with hot walls of a mold to at least partially reduce internal residual stresses in the preform. The preform can be cooled and then blown to the proper size in a second blow molding operation. Gartland et al., U.S. Pat. No. 4,463,121 teaches a polyethylene terephthalate polyolefin alloy having increased impact resistance, high temperature, dimensional stability and improved mold release. Ryder, U.S. Pat. No. 4,473,515 teaches an improved injection blow molding apparatus and method. In the method, a parison or preform is formed on a cooled rod from hot thermoplastic material. The preform is cooled and then transformed to a blow molding position. The parison is then stretched, biaxially oriented, cooled and removed from the device. Nilsson, U.S. Pat. No. 4,381,277 teaches a method for manufacturing a thermoplastic container comprising a laminated thermoplastic film from a preform. The preform has a thermoplastic layer and a barrier layer which is sufficiently transformed from a preformed shape and formed to a container. Jakobsen et al., U.S. Pat. No. 4,374,878 teaches a tubular preform used to produce a container. The preform is converted into a bottle. Motill, U.S. Pat. No. 4,368,825; Howard Jr., U.S. Pat. No. 4,850,494; Chang, U.S. Pat. No. 4,342,398; Beck, U.S. Pat. No. 4,780,257; Krishnakumar et al., U.S. Pat. No. 4,334,627; Snyder et al., U.S. Pat. No. 4,318,489; and Krishnakumar et al., U.S. Pat. No. 4,108,324 each teach plastic containers or bottles having preferred shapes or self-supporting bottom configurations. Hirata, U.S. Pat. No. 4,370,368 teaches a plastic bottle comprising a thermoplastic comprising vinylidene chloride and an acrylic monomer and other vinyl monomers to obtain improved oxygen, moisture or water vapor barrier properties. The bottle can be made by casting an aqueous latex in a bottle mold, drying the cast latex or coating a preform with the aqueous latex prior to bottle formation. Kuhfuss et al., U.S. Pat. No. 4,459,400 teaches a poly(ester-amid) composition useful in a variety of applications including packaging materials. Maruhashi et al., U.S. Pat. No. 4,393,106 teaches laminated or plastic containers and methods for manufacturing the container. The laminate comprises a moldable plastic material in a coating layer. Smith et al., U.S. Pat. No. 4,482,586 teaches a multilayer of polyester article having good oxygen and carbon dioxide barrier properties containing a polyisophthalate polymer. Walles, U.S. Pat. Nos. 3,740,258 and 4,615,914 teaches that plastic containers can be treated, to improve barrier properties to the passage of organic materials and gases, such as oxygen, by sulfonation of the plastic. Rule et al., U.S. Pat. No. 6,274,212 teaches scavenging acetaldehyde using scavenging compounds having adjacent to heteroatoms containing functional groups that can form five or six member bridge through condensation with acetaldehyde. Al-Malaika PCT WO 2000/66659 and Weigner et al., PCT WO 2001/00724 teach the use of polyol materials as acetaldehyde scavengers. Wood, et al. U.S. Pat. Nos. 5,837,339, 5,883,161 and 6,136,354, teach the use of substituted cyclodextrin in polyester for barrier properties.

Further, we are aware that the polyester has been developed and formulated to have high burst resistance to resist pressure exerted on the walls of the container by carbonated beverages. Further, some substantial work has been done to improve the resistance of the polyester material to stress cracking during manufacturing, filling and storage.

Beverage manufacturers have long searched for improved barrier material. In larger part, this research effort was directed to carbon dioxide ($CO_2$) barriers, oxygen ($O_2$) barriers and water vapor ($H_2O$) barriers. More recently, original bottle manufacturers have had a significant increase in sensitivity to the presence of beverage extractable or beverage soluble materials in the resin or container. This work has been to improve the bulk plastic with polymer coatings or polymer laminates of less permeable polymer to decrease permeability. However, we are unaware of any attempt at introducing into bulk polymer resin or polyester material of a beverage container, an active complexing compound to scavenge metal catalyst residues contained in the polyester resin during the preform manufacturing process, reducing catalytically generated beverage extractable or beverage soluble material caused by catalyst residues in the resin or container.

Even with this substantial body of technology, substantial need has arisen to develop biaxially oriented thermoplastic polymer materials for beverage containers that can substantially reduce the elution of reactive organic materials into a food or beverage in the container or reduce the passage of permeants in the extractable materials that pass into beverages intended for human consumption.

Stabilization of polyester resins and absorption of reactive organics such as acetaldehyde have drawn significant attention. Proposals for resolving the problem have been posed. One proposal involves using active stabilizers including phosphor compounds and nitrogen heterocycles as shown in WO 9744376, EP 26713 and U.S. Pat. No. 5,874,517 and JP 57049620. Another proposal, which has obtained great attention, includes solid state polycondensation (SSP) processing. The materials after the second polymerization stage are treated with water or aliphatic alcohols to reduce residuals by decomposition. Lastly, acetaldehyde can be scavenged with reactive chemical materials including low molecular weight partially aromatic polyamides based on xylylene diamine materials and low molecular weight aliphatic polyamides. [See, U.S. Pat. Nos. 5,258,233; 6,042,908 and European Patent No. 0 714 832, commercial polyamides see WO9701427, polyethylene imine see U.S. Pat. No. 5,362,784, polyamides of terephthalic acid see WO9728218 and the use of inorganic absorbents such as zeolytes, see U.S. Pat. No. 4,391,971.]

Bagrodia, U.S. Pat. No. 6,042,908 uses polyester/polyamide blends to improve flavor of ozonated water. Hallock, U.S. Pat. No. 6,007,885 teaches oxygen-scavenging compositions in polymer materials. Ebner, U.S. Pat. No. 5,977,212 also teaches oxygen-scavenging materials in polymers. Rooney, U.S. Pat. No. 5,958,254 teaches oxygen scavengers without transitional catalysts for polymer materials. Speer, U.S. Pat. No. 5,942,297 teaches broad product absorbance to be combined with oxygen scavengers in polymer systems. Palomo, U.S. Pat. No. 5,814,714 teaches blended mono-olefin/polyene interpolymers. Lastly, Visioli, U.S. Pat. No. 5,350,788 teaches method for reducing odors in recycled plastics.

In implementing the technologies using various scavenging materials in polyester beverage polymers, a significant need remains for technology that reduces the concentration of organic materials such as aldehyde, ketone and acids in polyester without the reduction of antimony to gray or black metallic residue. In particular, a reduction in acetaldehyde residues in polyester is required. Further, a need exists to obtain reduced acetaldehyde concentration in polyesters along with introducing barrier properties in the polyester material.

BRIEF DISCUSSION OF THE INVENTION

We have found that polyester resin and polyester beverage containers can be made with an active component that can act to inhibit reactive organic chemical compound formation. The active components also offer an organic vapor barrier property to the container material. We have found that a small amount of a specific substituted cyclodextrin compound can be coated onto the polyester chip or pellet during bulk polyester resin manufacture. The polyester chip with the cyclodextrin compound can then be introduced into an extruder for the purpose of injection molding a polyester preform article or directly blowing the bottle. During extrusion, the cyclodextrin compound mixes with the melt polymer at high temperature during a set residence time. At the temperature of the melt extrusion, the cyclodextrin compound reacts with, complexes or associates with the metallic catalyst residues and prevents the production of catalytically generated reactive organic compounds, including aldehyde materials such as acetaldehyde. The cyclodextrin compound can also react with and scavenge volatile reactive materials such as acetaldehyde formed during the melt process. A preform or blow molding residence time is selected that results in effective aldehyde concentration reduction but without cyclodextrin or polymer degradation. Such a reduction in aldehyde concentration reduces or eliminates major off-odors and off-flavors in the thermoplastic polymer.

We have found that a small, but critical, loading of a specific cyclodextrin material on the thermoplastic polymer obtains excellent scavenging and barrier properties. Preferably, the cyclodextrin is formed in a coating layer on the polyester chip or pellet. Such coatings are made by dispersing or dissolving the cyclodextrin compound typically in solvent preferably in an aqueous solution and dispersing or spraying such aqueous solution onto the polymer chip or pellet following polycondensation and preferably after SSP. This amount of cyclodextrin is sufficient to provide such properties without unacceptable commercial discoloration of the polymer resin or any reduction in polymer clarity or physical properties. The cyclodextrin compound is typically incorporated with, dispersed into or suspended in the bulk polymer material used to make the beverage container. We have also found that the purity of the cyclodextrin aqueous solution is important in achieving reduced aldehyde, reduced color formation and preventing antimony reduction. Once formed, an aqueous cyclodextrin solution can be purified by contacting the solution with an activated charcoal absorbent, an ion exchange resin or a filtration apparatus including nanofiltration, reverse osmosis, etc. equipment.

Preferably, the cyclodextrin compound utilized in the technology of the invention involves a substituted β- or α-cyclodextrin. Preferred cyclodextrin materials are substituted on at least one of the 3-OH of the glucose moiety in the cyclodextrin ring. β-Cyclodextrin materials comprise seven glucose moieties forming the cyclodextrin ring. Any of such hydroxyl groups can be substituted. The degree of substitution (D.S.) of the cyclodextrin material can range from about 0.3 to 1.8; preferably the degree of substitution can range from about 0.5 to 1.2. We found that complexing metallic catalyst residues in the polymer material, a beta or alpha cyclodextrin is preferred. Further, the degree of substitution has an important role in ensuring that the cyclodextrin is compatible with the melt polymer, but is not so substituted that the cyclodextrin cannot participate in complexing catalyst residues. We have further found that the amount of the substituted cyclodextrin material useful in preventing the formation of aldehyde by complexing metallic catalyst residues is less than the amount of cyclodextrin active in barrier structures. The effective amount of a substituted cyclodextrin for aldehyde suppression ranges from about 100 ppm to 1,400 ppm based on the polymer composition as a whole preferably 350 ppm to 900 ppm. The principle mechanistic action of the substituted cyclodextrin material is a coordination complex of the metallic catalyst where more than one metal ion is bound per cyclodextrin. Metallocyclodextrins are formed from substituted cyclodextrins (6-position —OH) which consist of two cyclodextrins linked together through the secondary hydroxyl groups (3- and 2-positions) of the unmodified (native) cyclodextrin losing a proton to produce an alkoxide to coordinate a metal ion forming the simplest type of metallocyclodextrin. Accordingly, a substantial and effective fraction of the cyclodextrin must be available for catalyst residue complexation to accomplish the goal of the invention. The compatible cyclodextrin compounds are introduced into the melt thermoplastic substantially free of an inclusion complex or inclusion compound. For this invention the term "substantially free of an inclusion complex" means that the quantity of dispersed cyclodextrin material in the coating on the polyester chip or pellet is free of a complex material or "guest compound" in the central pore of the cyclodextrin molecule. A first aspect of the invention comprises a thermoplastic pellet or chip having a major proportion of the thermoplastic polyester material used in making the preform or the beverage container. The pellet or chip comprises an exterior coating layer, an effective metal catalyst scavenger and volatile organic barrier-providing amount of a cyclodextrin compound. Such an exterior coating of cyclodextrin can be made from an aqueous solution of the cyclodextrin material. The aqueous solution can be made by dissolving a cyclodextrin material in an aqueous medium to form a solution and purifying the solution. A second aspect of the invention comprises a process of forming a purified cyclodextrin solution by contacting a cyclodextrin solution with and activated carbon absorbent, an ion exchange resin, or membrane filtration equipment. A third aspect of the invention comprises a thermoplastic preform having within the polymer matrix, an effective amount of the cyclodextrin compound for reducing volatile organic materials such as acetaldehyde produced during injection molding and for introducing a barrier property into the thermoplastic polymer. A fourth aspect of the invention comprises a thermoplastic beverage container having the metal catalyst scavenger property and a volatile organic barrier property that results from the manufacture of the beverage container from the preform of the invention. Lastly, a fifth aspect of the invention comprises a method for manufacturing a polyester beverage container from the coated pellet or chip of the invention through a preform stage. In each of these aspects, the use of the purified cyclodextrin material results in a clear, substantially water white polyester material having little or no organic material to produce off odors or off flavors in the food material within a polyester container.

BRIEF DISCUSSION OF THE DRAWINGS

FIG. 1 is a graphical representation of the dimensions of a cyclodextrin molecule without derivatization. The central pore comprises the hydrophilic space, central pore or volume within the cyclodextrin molecule that can act as a site for absorbing a permeant or such contaminant. Secondary hydroxyl groups can form metallocyclodextrin coordination complexes by linking two cyclodextrin moieties through the secondary hydroxyls producing an alkoxide to coordinate metal ions. In the FIGURE, $\alpha$, $\beta$, or $\gamma$-cyclodextrin is shown. Such cyclodextrins have hydroxyl groups formed on the perimeter of the molecule that are available for reaction with a volatile organic material such as acetaldehyde.

DETAILED DISCUSSION OF THE INVENTION

Figure 2:
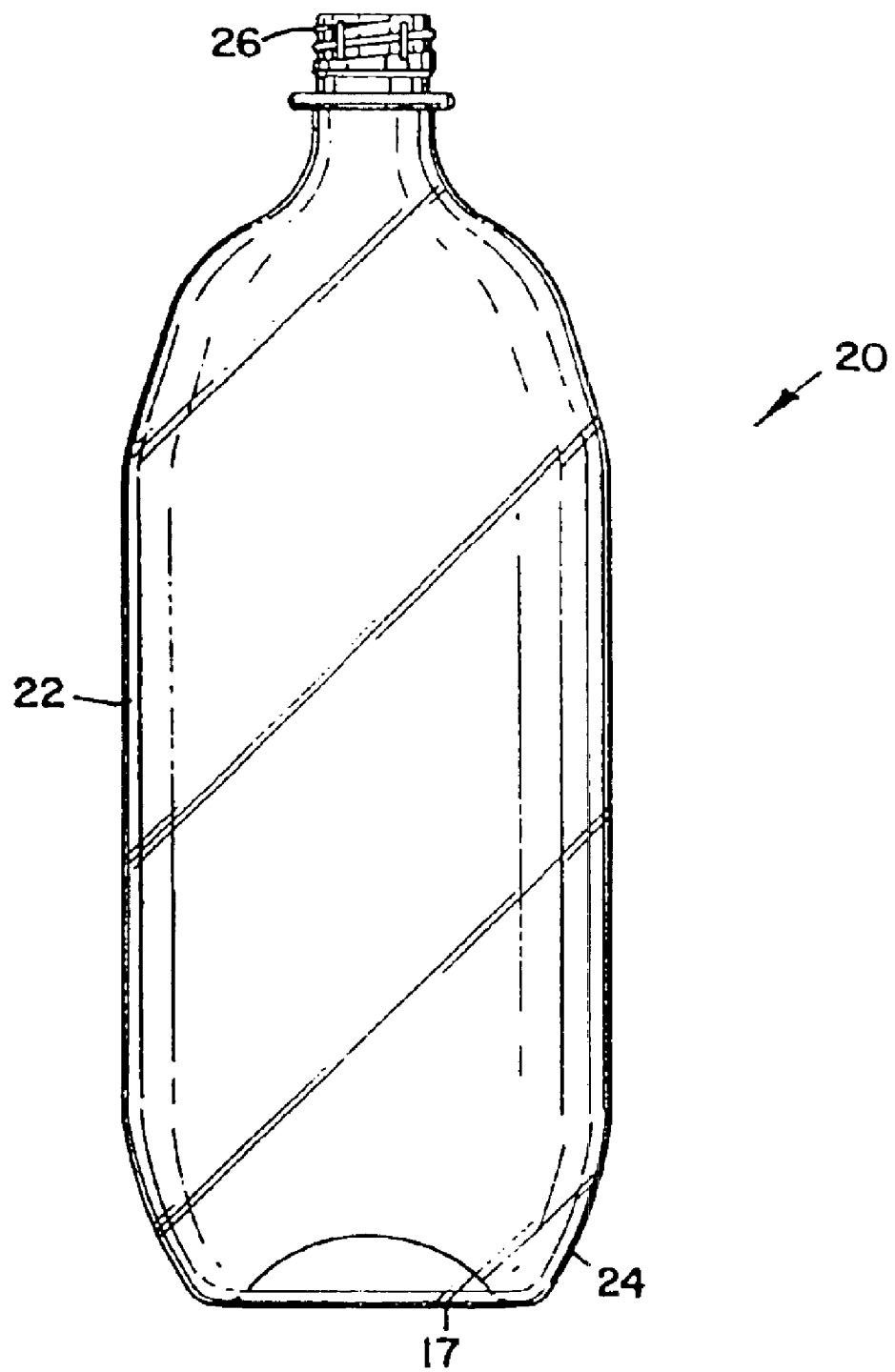
FIG. 2 is an isometric view of a two liter polyester bottle of the invention into which the cyclodextrin compounds are formed.
Figure 3:
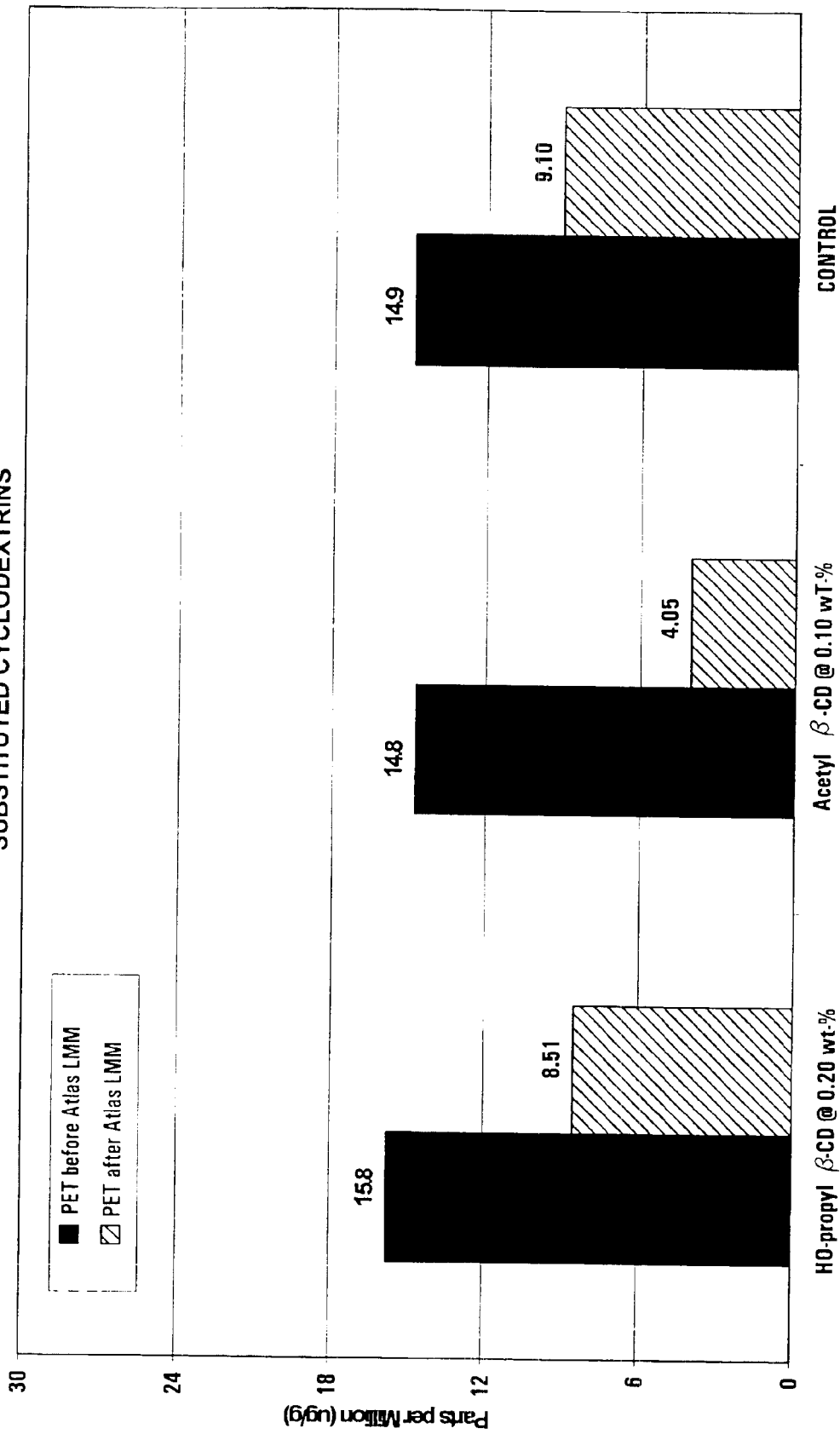
FIG. 3 is a bar graph representation of the acetaldehyde reduction data using substituted cyclodextrin materials.
Figure 4:
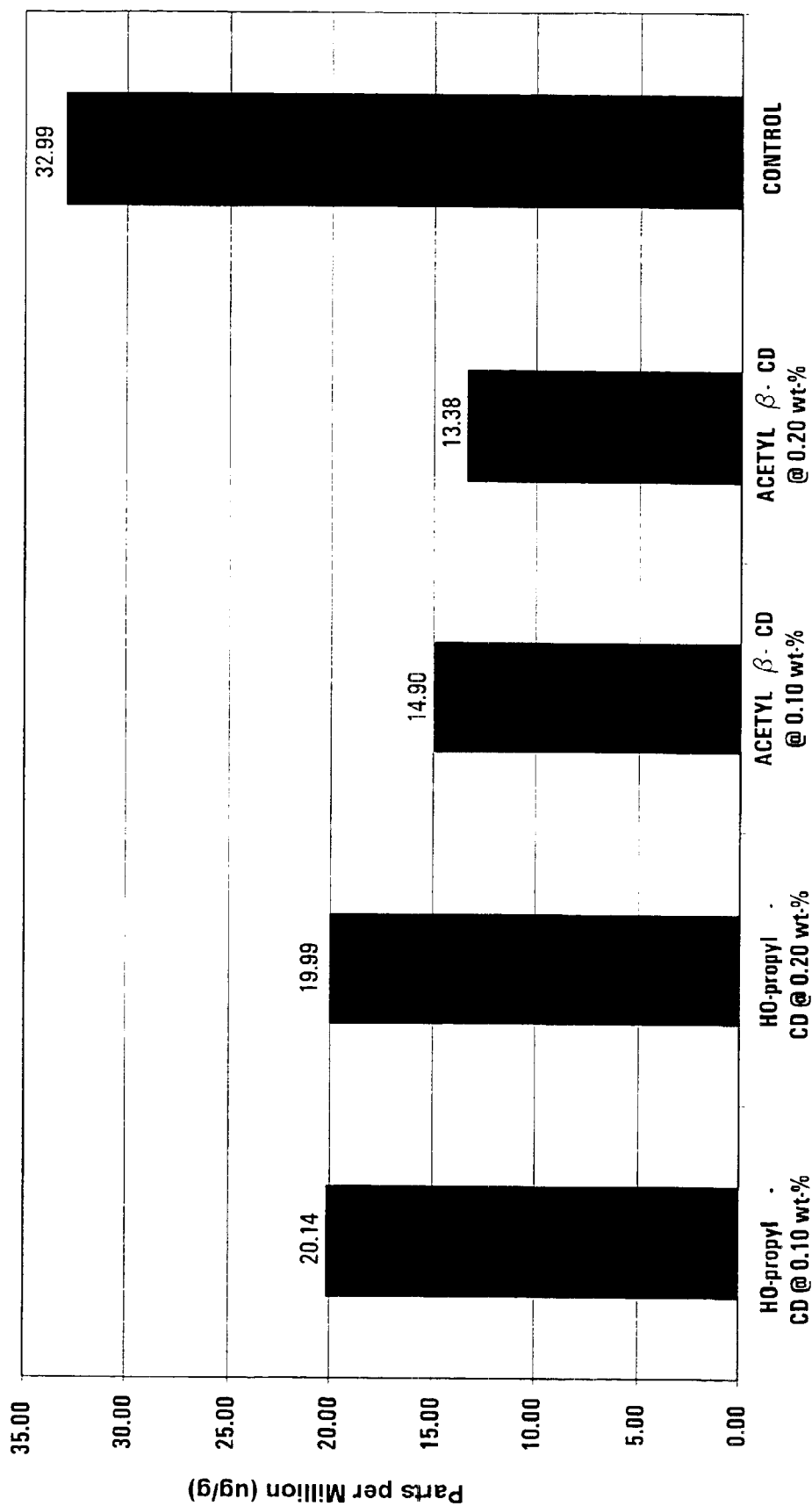
FIG. 4 is a bar graph representation of acetaldehyde reduction data using substituted cyclodextrin materials.

We have found that the packaging properties of polyester materials can be substantially improved using a substituted cyclodextrin material at a concentration that can prevent the formation of an organic material such as an aldehyde, or scavenge the formed organic material. We further found that using a purified cyclodextrin material is preferred for polyester processing. We further found that a preferred degree of substitution, concentration of substituted cyclodextrin and processing conditions produces a high-quality polyester material. We have found that combining a modified cyclodextrin material with the polymer obtains improved reactive organic compound properties and a reduced tendency to release polymer residue (e.g. acetaldehyde).

Suitable polyesters are produced from the reaction of a diacid or diester component comprising at least 60 mole percent terephthalic acid (TA) or $C_1$-$C_4$ dialkyl terephthalate, preferably at least 75 mole percent, and more preferably at least 85 mole percent; and a diol component comprising at least 60 mole percent ethylene glycol (EG), preferably at least 75 mole percent, and more preferably at least 85 mole percent. It is also preferred that the diacid component be TA, or the dialkyl terephthalate component be dimethyl terephthalate (DMT), and the diol component is EG. The mole percentage for all the diacids/dialkyl terephthalate components total 100 mole percent, and the mole percentage of all diol components total 100 mole percent.

Alternatively, suitable polyesters are produced from the reaction of a diacid or diester component comprising at least 60 mole percent 2,6-naphthalene dicarboxylic acid (NDA) or $C_1$-$C_4$ dialkyl napthalate, preferably at least 75 mole percent, and more preferably at least 85 mole percent; and a diol component comprising at least 60 mole percent ethylene glycol (EG), preferably at least 75 mole percent, and more preferably at least 85 mole percent.

Where the polyester components are modified by one or more diol components other than EG, suitable diol components of the described polyester can be selected from 1,4-cyclohexanedimethanol; 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclohexanedimethanol; and diols containing one or more oxygen atoms in the chain, for example diethylene glycol, triethylene glycol, dipropylene glycol, tripropylene glycol or mixtures of these and the like. In general, these diols contain 2 to 18, and preferably 2 to 8 carbon atoms. Cycloaliphatic diols can be employed in their cis or trans configuration or as mixtures of both forms.

Where the polyester components are modified by one or more acid components other than TA, suitable acid components of the linear polyesters may be selected from the class of isophthalic acid; 1,4-cyclohexanedicarboxylic acid; 1,3-cyclohexanedicarboxylic acid; succinic acid; glutaric acid; adipic acid; sebacic acid; 1,12-dodecanedioic acid; 2,6-naphthalene dicarboxylic acid; 2,7-naphthalene dicarboxylic acid, t-stilbene dicarboxylic acid, 4,4'-bibenzoic acid, or mixtures of these or their anhydride equivalents, and the like. In the case of polyethylene naphthalate, 2,6-naphthalene dicarboxylic acid can be used in place of the terephthalic acid listed above.

A typical PET based polymer for the beverage container industry has about 97 mole percent PET and 3 mole percent isophthalate—thus it is the copolymer polyethylene terephthalate/isophthalate. In the polymer preparation, it is often preferred to use a functional acid derivative thereof such as dimethyl, diethyl or dipropyl ester of a dicarboxylic acid. The anhydrides or acid halides of these acids may also be employed where practical. These acid modifiers generally retard the crystallization rate compare to terephthalic acid.

Conventional production of polyethylene terephthalate is well known in the art and comprises reacting terephthalic acid (TA) (or dimethyl terephthalate—DMT) with ethylene glycol (EG) at a temperature of approximately 200 to 250° C. forming monomer and water (monomer and methanol, when using DMT). Because the reaction is reversible, the water (or methanol) is continuously removed, thereby driving the reaction to the production of monomer. The monomer comprises primarily BHET (bishydroxyethylene terephthalate), some MHET (monohydroxyethylene terephthalate), and other oligomeric products and small amounts of unreacted raw materials. Subsequently, the BHET and MHET undergo a polycondensation reaction to form the polymer. During the reaction of the TA and EG it is not necessary to have a catalyst present. During the reaction of DMT and EG employing an ester interchange catalyst is required. Suitable ester interchange catalysts include compounds containing cobalt (Co), zinc (Zn), manganese (Mn), and magnesium (Mg), to name a few. Generally, during the polycondensation reaction the preferred catalyst is antimony in the form of an antimony salt or compound. Often bottle grade PET resin, during manufacture, is heated under inert ambient atmosphere to promote further polymerization in the resin or processed as an SSP resin. Typically bottle grade PET resin has an intrinsic viscosity (IV) of about 0.70 to about 0.85 dL/g.

Injection blow molding processes are used to produce polyester bottles. Two manufacturing techniques are typically used. In one method, a preform is made by injection molding techniques in a preform shape having the neck and screw-cap portion of the bottle in approximately useful size but having the body of the preform in a closed tubular form substantially smaller than the final bottle shape. A single component or multi-layered perform can be used. The preform is then inserted into a blow-molding machine where it is heated enough to allow the preform to be inflated and blown into the appropriate shape. Alternatively, the resin can be injection blow molded over a steel-core rod. The neck of the bottle is formed with the proper shaped received closures (cap) and resin is provided around the temperature-conditioned rod for the blowing step. The rod with the resin is indexed into the mold and the resin is blown away from the rod against the mold walls. The resin cools while in contact with the mold forming the transparent bottle. The finished bottle is ejected and the rod is moved again in the injection molding station. This process is favored for single cylindrical bottles.

The most common machine involves a four station apparatus that can inject resin, blow the resin into the appropriate shape, strip the formed container from the rod and recondition the core rod prior to the repeat of the process. Such containers are typically manufactured with the closure fitment portion comprising a threaded neck adapted to a metal screw cap. The bottle bottom typically has a lobed design such as a four-lobe or five-lobe design to permit the bottle to be placed in a stable upright position. The manufacturing equipment has been continually upgraded to add blowing stations and increased throughput.

Cyclodextrin

The thermoplastic materials of the invention contain a cyclodextrin compound that can comprise a cyclodextrin having one substituent group, preferably on a primary carbon atom. Such cyclodextrin materials have been shown to be compatible with thermoplastic polyester materials in scavenging and barrier properties. The cyclodextrin material can be added to the thermoplastic and, during melt processing, provide scavenging properties and barrier properties in the preform and in the final beverage container. The cyclodextrin materials, under good manufacturing conditions of time and temperature, are compatible, do not burn, and do not result in the formation of haze or reduced structural properties or clarity in the appearance of the polymer in the final container.

Cyclodextrin (CD) is a cyclic oligosaccharide consisting of at least five, preferably six, glucopyranose units joined by an $\alpha(1\rightarrow 4)$ linkage. Although cyclodextrin with up to twelve glucose residues are known, the three most common homologs ($\alpha$-cyclodextrin, $\beta$-cyclodextrin and $\gamma$-cyclodextrin) having 6, 7 and 8 residues are known and are useful in the invention.

Cyclodextrin is produced by a highly selective enzymatic synthesis from starch or starch-like materials. They commonly consist of six, seven, or eight glucose monomers arranged in a donut shaped ring, which are denoted $\alpha$, $\beta$ and $\gamma$ cyclodextrin respectively (See FIG. 1). The specific coupling of the glucose monomers gives the cyclodextrin a rigid, truncated conical molecular structure with a hollow interior of a specific volume. This internal cavity, which is a polar (i.e., is attractive to a wide range of hydrocarbon materials when compared to the hydrophilic exterior, is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex. These complexes are unusual in that only secondary bonding occurs between the CD and guest, yet their stability can be quite high depending on the characteristics of the cyclodextrin and guest. A metal-cyclodextrin assembly demonstrates all the basic bonding modes (non-specific Van der Waals bonds, hydrogen bonds and ligand-to-metal bonds) in a singular molecular system.

| Properties CD | $\alpha$-CD | $\beta$-CD | $\gamma$-CD |
| --- | --- | --- | --- |
| Degree of polymerization (n =) | 6 | 7 | 8 |
| Molecular Size (Å) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[\alpha]_D^{25}$ | +150.5 | +162.5 | +177.4 |
| Color of iodine complex | Blue | Yellow | Yellowish-Brown |
| Solubility in water (g/100 ml) 25° | | | |
| Distilled water | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The torus interior is hydrophobic due to the presence of methylene ($—CH_2—$) and ether ($—O—$) groups. The parent cyclodextrin molecule, and useful derivatives, can be represented by the following formula (the ring carbons show conventional numbering) in which the vacant bonds represent the balance of the cyclic molecule:

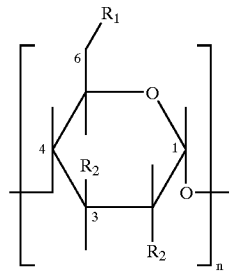

wherein n=6, 7 or 8 glucose moieties and $R_1$ and $R_2$ are primary or secondary hydroxyl or substituent groups (methoxy, acetyl, etc.), respectively. The cyclodextrin molecule shown above has —OH groups available for reaction at the 6-position (a primary group) and at the 3- and 2-positions (secondary groups). While the preferred cyclodextrin compound for use in aldehyde scavenging is a β-cyclodextrin, substituted cyclodextrins can be used to enhance barrier properties. The preferred cyclodextrin is substituted at one or more of the $R_1$ primary hydroxyls in the oligomer. Preferred cyclodextrins are first β-CD, then α-CD and are primarily substituted at the 6-position.

The preferred preparatory scheme for producing a derivatized cyclodextrin material having a functional group compatible with the thermoplastic polymer involves reactions at the primary hydroxyls with a minimum of the secondary hydroxyls of the cyclodextrin molecule being substituted. Coordination compounds or metal complexes in which the modified cyclodextrin acts as a ligand requires the secondary hydroxyl groups to be free of a derivative. A sufficient number of primary hydroxyls need to be modified to possess compatibility with the polymer and thermal stability in the process. Generally, we have found that a broad range of pendant substituent moieties can be used on the molecule. These derivatized cyclodextrin molecules can include acylated cyclodextrin, alkylated cyclodextrin, cyclodextrin esters such as tosylates, mesylate and other related sulfo derivatives, hydrocarbyl-amino cyclodextrin, alkyl phosphono and alkyl phosphato cyclodextrin, imidazoyl substituted cyclodextrin, pyridine substituted cyclodextrin, hydrocarbyl sulfur containing functional group cyclodextrin, silicon-containing functional group substituted cyclodextrin, carbonate and carbonate substituted cyclodextrin, carboxylic acid and related substituted cyclodextrin and others. The substituent moiety must include a region that provides compatibility to the derivatized material.

Acyl groups that can be used as compatibilizing functional groups include acetyl, propionyl, butyryl, trifluoroacetyl, benzoyl, acryloyl and other well-known groups. The formation of such groups on either the primary or secondary ring hydroxyls of the cyclodextrin molecule involve well-known reactions. The acylation reaction can be conducted using the appropriate acid anhydride, acid chloride, and well-known synthetic protocols. Peracylated cyclodextrin can be made. Further, cyclodextrin having less than all of available hydroxyls substituted with such groups can be made with one or more of the balance of the available hydroxyls substituted with other functional groups.

Cyclodextrin materials can also be reacted with alkylating agents to produced an alkylated cyclodextrin, a cyclodextrin ether. Alkylating groups can be used to produce peralkylated cyclodextrin using sufficient reaction conditions to exhaustively react the available hydroxyl groups with the alkylating agent. Further, depending on the alkylating agent, the cyclodextrin molecule used in the reaction conditions can produce cyclodextrin substituted at less than all of the available hydroxyls. Typical examples of alkyl groups useful in forming the alkylated cyclodextrin include methyl, propyl, benzyl, isopropyl, tertiary butyl, allyl, trityl, alkyl-benzyl and other common alkyl groups. Such alkyl groups can be made using conventional preparatory methods, such as reacting the hydroxyl group under appropriate conditions with an alkyl halide, or with an alkylating alkyl sulfate reactant. The preferred cyclodextrin is a simple lower alkyl ether, such as methyl, ethyl, n-propyl, t-butyl, etc. and is not peralkylated but has a degree of substitution of about 0.3 to 1.8.

Tosyl(4-methylbenzene sulfonyl) mesyl (methane sulfonyl) or other related alkyl or aryl sulfonyl forming reagents can be used in manufacturing compatibilized cyclodextrin molecules for use in thermoplastic resins. The primary —OH groups of the cyclodextrin molecules are more readily reacted than the secondary groups. However, the molecule can be substituted on virtually any position to form useful compositions.

Such sulfonyl containing functional groups can be used to derivatize either of the secondary hydroxyl groups or the primary hydroxyl group of any of the glucose moieties in the cyclodextrin molecule. The reactions can be conducted using a sulfonyl chloride reactant that can effectively react with either primary or secondary hydroxyls. The sulfonyl chloride is used at appropriate mole ratios depending on the number of target hydroxyl groups in the molecule requiring substitution. Either symmetrical (per substituted compounds with a single sulfonyl moiety) or unsymmetrical (the primary and secondary hydroxyls substituted with a mixture of groups including sulfonyl derivatives) can be prepared using known reaction conditions. Sulfonyl groups can be combined with acyl or alkyl groups generically as selected by the experimenter. Lastly, monosubstituted cyclodextrin can be made wherein a single glucose moiety in the ring contains between one and three sulfonyl substituents. The balance of the cyclodextrin molecule remaining unreacted.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nucleophilic displacement of the sulfonate group by an azide ($N_3^{-1}$) ion. The azido derivatives are subsequently converted into substituted amino compounds by reduction. Large numbers of these azido or amino cyclodextrin derivatives have been manufactured. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen-containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can be further reacted with other compounds that react with the nitrogen atom to further derivatize the amine group. Other possible nitrogen containing substituents include dialkylamino such as dimethylamino, diethylamino, piperidino, piperizino, quaternary substituted alkyl or aryl ammonium chloride substituents. Halogen derivatives of cyclodextrins can be manufactured as a feed stock for the manufacture of a cyclodextrin molecule substituted with a compatibilizing derivative. In such compounds, the primary or secondary hydroxyl groups are substituted with a halogen group such as fluoro, chloro, bromo, iodo or other substituents. The most likely position for halogen substitution is the primary hydroxyl at the 6-position.

Hydrocarbyl substituted phosphono or hydrocarbyl substituted phosphato groups can be used to introduce compatible derivatives onto the cyclodextrin. At the primary hydroxyl, the cyclodextrin molecule can be substituted with alkyl phosphato, aryl phosphato groups. The 2, and 3, secondary hydroxyls can be branched using an alkyl phosphato group.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Apart from the sulfonyl acylating groups found above, sulfur containing groups manufactured based on sulfhydryl chemistry can be used to derivatize cyclodextrin. Such sulfur containing groups include methylthio (—SMe), propylthio (—SPr), t-butylthio (—S—C(CH$_3$)$_3$), hydroxyethylthio (—S—CH$_2$CH$_2$OH), imidazolylmethylthio, phenylthio, substituted phenylthio, aminoalkylthio and others. Based on the ether or thioether chemistry set forth above, cyclodextrin having substituents ending with a hydroxyl aldehyde ketone or carboxylic acid functionality can be prepared. Such groups include hydroxyethyl, 3-hydroxypropyl, methyloxylethyl and corresponding oxeme isomers, formyl methyl and its oxeme isomers, carbylmethoxy (—O—CH$_2$—CO$_2$H) and carbylmethoxymethyl ester (—O—CH$_2$CO$_2$—CH$_3$).

Cyclodextrin derivatives with compatibilizing functional groups containing silicone can be prepared. Silicone groups generally refer to groups with a single substituted silicon atom or a repeating silicone-oxygen backbone with substituent groups. Typically, a significant proportion of silicone atoms in the silicone substituent bear hydrocarbyl (alkyl or aryl) substituents. Silicone substituted materials generally have increased thermal and oxidative stability and chemical inertness. Further, the silicone groups increase resistance to weathering, add dielectric strength and improve surface tension. The molecular structure of the silicone group can be varied because the silicone group can have a single silicon atom or two to twenty silicon atoms in the silicone moiety, can be linear or branched, have a large number of repeating silicone-oxygen groups, and can be further substituted with a variety of functional groups. For the purposes of this invention, the simple silicone containing substituent moieties are preferred including trimethylsilyl, mixed methylphenyl silyl groups, etc. We are aware that certain β-CD and acetylated and hydroxy alkyl derivatives are available commercially.

Preferably, the cyclodextrin compound utilized in the technology of the invention involves a substituted β- or α-cyclodextrin. Preferred cyclodextrin materials are substituted substantially on the 6—OH of the glucose moiety in the cyclodextrin ring. The free hydroxyl groups at the 3- and 2-position of the glucose moieties in the cyclodextrin ring are important for metallic catalyst complex formation. The degree of substitution (D.S.) of the cyclodextrin material can range from about 0.3 to 1.8; preferably the degree of substitution can range from about 0.5 to 1.2. Further the degree of substitution has an important role in ensuring that the cyclodextrin is compatible with the polymer melt, but is not so substituted that the cyclodextrin cannot participate in complexing catalyst residues. We have further found that the amount of substituted cyclodextrin material useful in preventing the formation of aldehyde by complexing metallic catalyst residues is less than the amount of cyclodextrin typically used in barrier structures for volatile organic compounds. The effective amount of a substituted cyclodextrin for aldehyde suppression ranges from about 100 ppm to 1400 ppm based on the polymer composition as a whole, preferably 350 ppm to 900 ppm. We believe the mechanistic action of the substituted cyclodextrin material is one or more of the secondary hydroxyl groups form a coordination complex with the catalyst residues to form a metallocyclodextrin where more than one metal ion is bound per cyclodextrin. While the amounts of cyclodextrin useful in preventing formation of organic residuals during preform and bottle manufacture are less and that used in barrier applications, even at reduced amounts, the cyclodextrin materials can provide a degree of barrier properties. According to the concentrations disclosed in this application, regenerated acetaldehyde formation is substantially reduced in the polyester and some degree of barrier property is achieved. To achieve these results, a substantial and effective fraction of the cyclodextrin must be available for catalyst residue complexation to accomplish the goal of the invention. The compatible cyclodextrin compounds are introduced into the melt thermoplastic substantially free of an inclusion complex or inclusion compound. For this invention the term "substantially free of an inclusion complex" means that the quantity of dispersed cyclodextrin material in the coating on the polyester chip or pellet is free of a complex material or "guest compound" in the central pore of the cyclodextrin molecule. Materials other than the catalyst residue can occupy the central pore or opening of the cyclodextrin molecule, however, sufficient unoccupied cyclodextrin must be available to remove the catalyst from its aldehyde-generating role.

Raw material used in any of the thermoforming procedures is a chip form or a pelletized thermoplastic polyester. The thermoplastic polyester is made in the form of a melt and is converted to bulk polymer. The melt can be easily reduced to a useful pellet or other small diameter chip, flake or particulate. The pellet, chip, flake or particulate polyester can then be blended with the derivatized cyclodextrin material until uniform, dried to remove moisture, and then melt extruded under conditions that obtain a uniform dispersion or solution of the modified or derivatized cyclodextrin and polyester material. The resulting polyester pellet is typically substantially clear, uniform and of conventional dimensions. The pellet preferably contains about 0.01 to about 0.14 wt-% of the cyclodextrin compound, more preferably about 0.035 to about 0.09 wt-% of the cyclodextrin compound, polyester pellet containing the modified cyclodextrin material can then be incorporated into the conventional preform or parison with injection molding techniques. The products of these techniques contain similar proportions of materials.

The cyclodextrin compound can be incorporated onto the chip or pellet by coating the chip or pellet or similar structure with a liquid coating composition containing an effective amount of the cyclodextrin or substituted cyclodextrin. Such coating compositions are typically formed using a liquid medium. Liquid media can include aqueous media or organic solvent media. Aqueous media are typically formed by combining water with additives or other components to form coatable aqueous dispersions or solutions. Solvent based dispersions are based on organic solvents and can be made using known corresponding solvent based coating technology. The liquid coating compositions of the invention can be contacted with the polyester pellet, chip or flake using any common coating technology including flood coating, spray coating, fluidized bed coating, electrostatic coating or any other coating process that can load the pellet, chip or flake with sufficient cyclodextrin to act as a scavenger or barrier material in the final polyester bottle. Careful control of the amount and thickness of the ultimate coating optimizes the scavenger and barrier properties without waste of material, maintains clarity and color in the thermoplastic bottle and optimizes polyester physical properties. The cyclodextrin materials present in the aqueous coating solutions can contain from about 1.0 to about 50 wt.-% of the cyclodextrin, preferably about 3.0 to 40 wt.-% of the cyclodextrin in the liquid material. The coatings are commonly applied to the pellet, chip or flake and the liquid carrier portion of the solution or dispersion is removed typically by heating leaving a dry coating on the polyester. When dry, substantially no solution or liquid medium is left on the pellet. Commonly, the coated polyester is dried in a desiccant-dryer to remove trace amounts of residual water before injection molding. Typically, the PET chips are dried to 50 ppm or less moisture. Sufficient cyclodextrin is added to the polyester chip, pellet or flake such that the final finished perform or parison are ultimately blow molded polyester beverage container contains less than about 1,400 ppm of the cyclodextrin compound based on the total weight of the polyester. Greater than this amount of cyclodextrin compound in the polyester may impact regenerated acetaldehyde reduction, clarity and cause yellowing. Preferably, the amount of material in the polyester material ranges from about 350 ppm to 900 ppm of cyclodextrin compound in the polyester material.

Care must be taken during the manufacture of the preform or parison and the final manufacture of the container. During the manufacture of the perform and later during the manufacture of the container, sufficient heat history in terms of maintaining the melt polymer at a set temperature for a sufficient amount of time to obtain adequate scavenging and to thoroughly disperse the cyclodextrin material in the polymer matrix must be achieved. However, the time and temperature of the steps should not be so long as the cyclodextrin material can thermally decompose (i.e., ring open the cyclodextrin) resulting in a loss of scavenging capacity and barrier properties accompanied by polymer yellowing. Polymer haze can result during stretch blow molding unless a cyclodextrin derivative with a melting point below the preform reheat temperature is selected. Cyclodextrins with melting points greater than the preform reheat temperature will produce microvoids in the biaxially oriented bottle wall giving a hazy appearance to the polymer. Accordingly, depending on the equipment involved, the thermoplastic polyester is maintained in a melt form at a temperature greater than about 260° C., preferably about 270° C. to 290° C. for a total residence time greater than about 90 seconds preferably about 120±30 seconds to ensure adequate metal residue complexation during injection molding while ensuring that the cyclodextrin material prevents acetaldehyde generation. The total residence time is determined from the cycle time of the injection molding machine.

We have also found the cyclodextrin material is important in achieving the goals of the invention. As discussed above, the cyclodextrin material is applied to the polyester pellet or chip in the form of an aqueous solution. Such solutions are made by dissolving or suspending the cyclodextrin material in an aqueous medium. The aqueous solution is prepared from cyclodextrin materials where the trace impurities have been removed. These impurities can arise from the enzymatic manufacture of the cyclodextrin material producing linear starches, saccharide and polysaccharide precursor materials or from the synthetic reaction between the cyclodextrin material and reactants used to form the derivatives. Materials that are present as impurities in the substituted cyclodextrin material that cause off-yellow color in injection molded PET include iron, sodium chloride, acetic acid, iron acetate, sodium acetate, furfurals, linear starches and sugars, dehydrated linear starches, levoglucosan, levoglucosenone and proteins.

We have found that these cyclodextrin impurities can be effectively removing using purification techniques including contacting the aqueous cyclodextrin solution with activated charcoal or activated carbon absorbent, contacting the aqueous cyclodextrin solution with an ion exchange resin or by contacting the aqueous solution with nanofiltration or reverse osmosis equipment. We found that using these techniques reduced the concentration of impurities in the aqueous cyclodextrin solutions to levels that do not contribute to color generation in the polyester material, form undesirable organic materials or reduce antimony.

In such purification processes, the aqueous cyclodextrin solution is prepared at concentration of about 3 to 50 wt. percent of the cyclodextrin in the aqueous solution. Such an aqueous solution can be contacted with the carbon absorbent or resin absorbent a rate of about 10 to 350 liters solutions per kilogram of absorbent. The residence time of the solution in contact with the absorbent can be adjusted to obtain substantial impurities removal. The solution, however, is generally maintained in contact with the absorbent for a time period of about 0.5 to 24 hours.

In nanofiltration or reverse osmosis processing, the aqueous cyclodextrin material is directed into the appropriate purification equipment and is maintained, at an appropriate pressure, for appropriate period of time to ensure that a substantial proportion of the impurity in the cyclodextrin material passes through the filter or reverse osmosis membrane while the cyclodextrin material is retained in the reject aqueous solution. In this regard, about 700 to 1,200 liters of solution are passed through the equipment per square meter of filter or membrane and a rate of about 125 to 2,000 liters of solution per hour. The effluent passing through the filter or membrane comprises about 60 to 98% of the input stream. Typically, the nanofiltration or reverse osmosis equipment is operated at an internal pressure of about 125 to 600 psi.

Decolorizing resins like Dowex SD-2 (a tertiary amine functionalized macroporous styrene divinylbenzene copolymer) are used to remove PET yellow-color causing materials from aqueous cyclodextrin solutions. Other resins like Dowex Monosphere 77 (a weak base anion resin), Dowex MAC-3 (a weak cation resin), and Dowex 88 (a strong acid cation) can also be used in combination (infront) with Dowex SD-2. These resins can be operated with flow of 2 to 25 liters per minute per $ft^2$ of resin.

Outlined below is a method for evaluating dried cyclodextrin for thermal stability based upon the potential of generating off-color. This method mimics the processing of injection molding cyclodextrin coated PET chip. Approximately 2 mL of a 25 wt.-% cyclodextrin solution is placed into a 20 mL headspace vial (or equivalent). Evaporate water from the solution by heating the vial using a laboratory hot plate (or equivalent) at a moderate temperature. The vial is periodically agitated during heating, and the interior of the vial is swabbed with a lint free wipe to remove condensate. When the residue becomes viscous and begins to bubble the vial should be removed from the heat and gently rolled to coat the interior walls of the vial evenly. Place the coated vial into an oven at 60° C. for approximately 10 minutes to completely solidify the cyclodextrin residue by removing all remaining water. The clear CD residue may bubble and haze slightly when evaporation is complete. Remove the vial when dry and heat oven to 280° C. Place the vial into the 280° C. oven for exactly 2 minutes (if oven temperature drops when placing the vial into the oven, begin timing only when the oven temperature is >270° C.). Remove vial and allow to cool to room temperature. Cyclodextrin residue should remain colorless to just slightly off yellow.

DETAILED DESCRIPTION OF THE DRAWINGS

FIG. 1 is a generally isometric view of a conceptual representation of the dimensions of the various cyclodextrin molecules. FIG. 1 shows an α, β and γ cyclodextrin showing the dimensions of the exterior of the cyclodextrin ring along with the dimensions of the interior pore volume that can act as a trapping site for permeants or polymer impurities. View 1 shows that the primary and secondary hydroxyls exist on the edge of the circular form.

FIG. 2 is a side view of a substantially transparent two-liter carbonated beverage container. The container generally shown at 20 comprises a body 22, a base 24 and a cap portion 26. The overall shape of the container is formed in a thermoplastic blow molding operation. Base 24 is a self-supporting base formed during bottle manufacture. Such a bottle can contain either a second layer 17, prepared from a parison having a second thermoplastic material formed during parison formation or can have a second layer 17 derived from a liquid coating material. The liquid coating material can be either a parison coating or a bottle coating.

FIGS. 3–7 are discussed in the Experimental section below.

Experimental Section

The foregoing discussion illustrates various embodiments of the application and the acetaldehyde reduction and the barrier and complexing properties of the materials of the invention. The following examples and data further exemplify the invention and contain a best mode.

Test Methods

Intrinsic viscosity (IV) is determined by mixing 0.2 grams of typically amorphous polymer composition with 20 milliliters of dichloroacetic acid at a temperature of 25° C. using a Ubbelhode viscometer to determine the relative viscosity (RV). RV is converted to IV using the equation: IV=[(RV–1)×0.691]+0.063. The color of the polymer chips was determined by ASTM D 6290-98 using a Minolta Chroma-Meter CR-310 spectrophotometer, and reported as one or more of the CIE L*, a* and b* standard units. The haze of the preforms was also measured using this instrument.

Acetaldehyde Reductions in PET Resin Using Cyclodextrin

Acetaldehyde is a good model for the undesirable organic compound inhibiting properties of the invention. Table 1 contains (Examples 1–21) analytical test results showing acetaldehyde (AA) reductions in polycondensate amorphous, polyethylene terephthalate. Various cyclodextrin compounds (unmodified and modified), manufactured by Wacker Biochem Corporation, were added in the molten polycondensate polyethylene terephthalate in the last two minutes before the molten PET is extruded from the batch reactor, quenched in cold water and chipped into pellets (also called chips). This test was done to evaluate various cyclodextrins for removing acetaldehyde. The acetaldehyde concentration equilibrium in this particular batch process prior to extruding the molten resin is around 60 ppm. The cyclodextrin compound is added during the last two minutes of the process where it is dispersed with the reactor mixer. After two minutes, the polyethylene terephthalate is extruded from the mixer. The stream of molten resin exiting the batch reactor into the quenching water is called a noodle. A number of minutes are required to drain the molten resin from the reactor. The noodle samples were cryogenically cooled, ground to 10 mesh or finer and placed into a glass sample jar, which is immediately sealed. A 0.25+/–0.002 g sample of granulated PET is placed into a 22-ml glass vial. The vial is immediately capped using a Teflon® faced butyl rubber septa and aluminum crimp top. Acetaldehyde is desorbed from the sample into the headspace by heating the vial at 160° C. for 90 minutes then analyzed for acetaldehyde by static headspace gas chromatography using flame ionization detection. The materials with the 0.05 wt.-% and 0.10-wt.-% unmodified β-cyclodextrin compound were clear for the entire noodle extrudate.

TABLE 1

Examples 1-Polycondensate PET with various cyclodextrins and weight loadings showing intrinsic viscosity (IV), ethylene glycol residual (CEG), acetaldehyde (AA) concentration in ppm, and resin color measurements (L*, a* and b*) using the conventional CIE color parameters.

| Example | Concentration | Cyclodextrin Additive | IV | CEG | AA | L* | a* | b* | Yellow | Bright |
|---|---|---|---|---|---|---|---|---|---|---|
| Control | Control | none | 0.613[1] | 16 | 61 | 72.2 | 0.08 | –1.1 | 2.9 | 43.9 |
| 1 | 0.25 wt % | triacetyl β-CD (3 acetyl groups[2]) | 0.598 | 18 | 54 |  | 0.13 |  |  |  |
| 2 | 0.15 wt % | triacetyl β-CD (3 acetyl groups[2]) | 0.603 | 18 | 62 | 73.1 | –0.02 | 0.12 | 0.12 | 45.3 |
| 3 | 0.05 wt % | triacetyl β-CD (3 acetyl groups[2]) | 0.594 | 17 | 59 | 72.9 | 0.13 | –0.5 | –1.3 | 45 |
| 4 | 0.25 wt % | γ-cyclodextrin | 0.562 | 23 | 38 | 62.8 | 0.99 | 8 | 21.3 | 31.4 |
| 5 | 0.15 wt % | γ-cyclodextrin | 0.538 | 21 | 43 | 64.5 | 0.75 | 6 | 16 | 33.4 |
| 6 | 0.05 wt % | γ-cyclodextrin | 0.593 | 21 | 54 | 68.5 | 0.23 | 3.5 | 8.7 | 38.6 |
| 7 | 0.25 wt % | HO-propyl β-CD (0.65 HO-propyl groups[2]) | 0.576 | 20 | 40 | 68 | –0.55 | 5.6 | 12.7 | 38 |
| 8 | 0.15 wt % | HO-propyl β-CD (0.65 HO-propyl groups[2]) | 0.589 | 20 | 55 | 69.3 | –0.66 | 4.3 | 9.4 | 39.7 |
| 9 | 0.05 wt % | HO-propyl β-CD (0.65 HO-propyl groups[2]) | 0.611 | 18 | 57 | 70.2 | –0.7 | 1.2 | 2.2 | 41.5 |
| 10 | 0.25 wt % | acetyl β-CD (1.1 acetyl group[2]) | 0.569 | 22 | 28 | 70.1 | –0.7 | 4.6 | 10.4 | 40.3 |
| 11 | 0.15 wt % | acetyl β-CD (1.1 acetyl group[2]) | 0.576 | 20 | 29 | 68.5 | –0.6 | 10.9 | 23.5 | 39.9 |
| 12 | 0.05 wt % | acetyl β-CD (1.1 acetyl group[2]) | 0.583 | 23 | 39 | 71 | –0.8 | 4.1 | 8.6 | 42.2 |
| 13 | Control | Blank Addition | 0.612 | 21 | 61 | 69 | –0.7 | 0.3 | –0.4 | 39.1 |
| 14 | Repeat of Example 5 |  | 0.533 | 26 | 56 | 58.5 | 1.5 | 11 | 31 | 26.0 |
| 15 | Repeat of Example 8 |  | 0.582 | 22 | 39 | 67.2 | –0.74 | 5.85 | 12.9 | 37.4 |
| Control | Blank Control |  | 0.62 | 17 | 65 | Clear |  |  |  |  |
| 16 | 0.05 wt % | α-cyclodextrin | 0.593 | 15 | 33/64[4] | Clear but went yellow ½ way |  |  |  |  |
| 17 | 0.1 wt % | α-cyclodextrin | 0.592 | 17 | 32 | Clear but went yellow ½ way |  |  |  |  |
| 18 | 0.25 wt % | α-cyclodextrin | .596/.564[3] | 17/20 | 32/27[4] | Slight Haze |  |  |  |  |
| 19 | 0.05 wt % | β-cyclodextrin | .614/.603[3] | 16/16 | 33/44[4] | Clear |  |  |  |  |
| 20 | 0.1 wt % | β-cyclodextrin | .612/.598[3] | 16/18 | 36/42[4] | Clear |  |  |  |  |
| 21 | 0.25 wt % | β-cyclodextrin | .577/.571[3] | 19/20 | 34/41[4] | Clear for 10 seconds |  |  |  |  |

[1]Composite of entire noodle extrudate
[2]Pendent groups per glucose unit
[3]Start of noodle extrudate/end of noodle extrudate
[4]Start of noodle extrudate/end of noodle extrudate These data show that cyclodextrin material having a limited degree of substitution can contribute to reduced acetaldehyde formation and, in some examples, reduced color formation in the polyester, while maintaining useful polyester mechanical properties.

TABLE 2

Summary of Best Performing Cyclodextrin Samples from Table 1

| Concentration | Cyclodextrin | % AA Reduction | b* | Noodle Color |
|---|---|---|---|---|
| 0.15 wt % | acetyl β-CD (1.1 acetyl group[1]) | 52% | 10.9 | |
| 0.05 wt % | acetyl β-CD (1.1 acetyl group[1]) | 36% | 4.1 | |
| 0.05 wt % | α-cyclodextrin | 49/0%[2] | NA | Clear then yellow |
| 0.05 wt % | β-cyclodextrin | 49/2%[2] | NA | Clear |
| 0.25 wt % | HO-propyl β-CD (0.65 hydroxy propyl groups[1]) | 33% | 5.6 | Clear then yellow |
| 0.25 wt % | γ-cyclodextrin | 38% | 8.0 | Clear then yellow |

[1]Pendent groups per glucose moiety or unit
[2]Start of noodle extrudate/end of noodle extrudate The data in Table 2 suggest that low loading amounts of the cyclodextrin material, having a limited degree of substitution, can provide excellent acetaldehyde reduction. These data suggest that further experimentation with optimized substituted cyclodextrin materials at low concentrations can provide excellent results.

Polyethylene terephthalate based polyester prepared by conventional continuous process polycondensation procedures, well known in the art, can be used in combination with a process including the late-addition of a substituted cyclodextrin. The cyclodextrin derivative material can be added in a late stage of polyester manufacture. For example, the cyclodextrin dispersed in a liquid carrier can be injected into the molten polyester after initial polymerization but before it exits from the polycondensation reactor, prior to formation into a pelletized or other shaped form.

The invention is further illustrated using a continuous pilot line (40 kg/hour polyester output) process to manufacture a commercial grade copolymer packaging resin (KoSa 1102) with a nominal intrinsic viscosity of 0.84 dl/g, a diethylene glycol content of <2.0%, a density of 1.39 g/cc and a melting point of 244° C. The cyclodextrin powder is delivered into the polyester flow using a material comprising a pumpable slurry containing a 50/50 by weight mixture of triacetyl β-cyclodextrin and an oil carrier (Emery 3004). The triacetyl beta cyclodextrin (W7TA from Wacker Biochem Corporation) had a differential scanning calorimetry (DSC) melting point of 191° C., 1200 ppm of residual acetic acid by sodium hydroxide titration with phenolphthalein indicator, 400 ppm acetate by ion chromatography, and when analyzed by Matrix Assisted Laser Desorption Time of Flight Mass Spectrometry (MALDI-TOF/MS) was found to contain 96% peracetylated beta cyclodextrin with the remaining 4% comprising a cyclodextrin moiety having one free hydroxyl group. Before mixing the triacetyl β-cyclodextrin into the carrier, it was dried in a vacuum oven at 105° C. under 1 mm Hg for sixteen (16) hours. The acetyl cyclodextrin derivative was dispersed into the carrier oil using low shear mixing. The mixture had a density of 1.05 grams/CC.

During the operation of the continuous process pilot line, the slurry was pumped into the molten polyester using a microprocessor controlled syringe pump (ISCO, 500D Syringe Pump) to precisely meter the viscous slurry. The cyclodextrin/oil carrier slurry was introduced into the polyester melt before an inline baffled mixing chamber used to thoroughly mix the slurry into the polyester just prior to exiting the reactor, quenching water and chipping the polyester noodle. The residence time of the cyclodextrin in the 285° C. polyester flow before exiting the reactor was 1 to 2 minutes. Two cyclodextrin loadings (0.20% and 0.25% by weight) were produced by late-addition process described above. The pump was programmed to meter 152 mL and 190 mL per hour for the 0.20% and 0.25% cyclodextrin loadings based on the polyester resin, respectively. The following amorphous polyester test results were obtained from the control polyester and two polyester samples containing cyclodextrin.

TABLE 3

Continuous process line amorphous resin properties

| Sample Description | IV (dl/g) | CEG Mmole/kg | L* | b* | AA (ppm) |
|---|---|---|---|---|---|
| 1102 Control | 0.609 | 12.6 | 57.9 | −0.3 | 49 |
| 0.20 wt % Triacetyl β-CD | 0.612 | 12.3 | 58.1 | −0.3 | 46 |
| 0.25 wt % Triacetyl β-CD | 0.616 | 13.6 | 58.2 | −0.2 | 49 |

The amorphous chip materials were then subjected to SSP (solid state polymerization) using a 25 Kg tumbler at a temperature of 210° C. for 16 hours under vacuum. The crystallized materials were checked again for IV, CIE color and acetaldehyde content and the data is given below:

TABLE 4

Solid state polymerization rate and crystalline chip properties.

| Sample Description | SSP rate IV/hr | SSP'ed IV dl/g | CEG Mmole/kg | L* | b* | AA (ppm) |
|---|---|---|---|---|---|---|
| 1102 Control | 0.0124 | 0.830 | 10 | 55.1 | −6.3 | 0.35 |
| 0.20 wt % Triacetyl β-CD | 0.0137 | 0.841 | 11 | 51.7 | 8.6 | 0.64 |
| 0.25 wt % Triacetyl β-CD | 0.0145 | 0.846 | 12 | 50.3 | 8.4 | 0.64 |

The cyclodextrin containing resins showed 10–17% faster SSP rate than the control. The crystallized resin samples containing CD had a noticeable yellow color as shown by the higher b* values in the above table.

TABLE 5

Preform properties.
The crystallized chip was injection molded at 270° C. into 26-gram preforms and tested for IV, CEG, CIE color and acetaldehyde. Results follow.

| Sample Description | IV dl/g | CEG Mmole/kg | L* | b* | Haze | AA (ppm) |
|---|---|---|---|---|---|---|
| 1102 Control | 0.769 | 13 | 69.2 | 2.95 | 43.7 | 9.4 |
| 0.20 wt % Triacetyl β-CD | 0.742 | 17 | 67.1 | 16.0 | 45.1 | 5.9 |
| 0.25 wt % Triacetyl β-CD | 0.744 | 19 | 65.1 | 16.6 | 45.8 | 4.7 |

The cyclodextrin containing preforms were significantly more yellow (approximately 13 units higher) than the control preform. Preform acetaldehyde was reduced 37% and 50% for 0.20-wt % and 0.25-wt % cyclodextrin, respectively.

This method is not desirable if the polyester/acetyl cyclodextrin derivative mixture will be subjected to solid state polymerization since undesirable color may develop during extended time at elevated temperature. The off-color produced in SSP processed polyester chip containing triacetyl β-cyclodextrin is caused by the degradation of the cyclodextrin molecule. Initially, the cyclodextrin structure ring-opens through heterolytic scission of the glucosidic linkage, analogous to acid hydrolysis, resulting in the formation of a polysaccharide with a unit of levogucosan at one end. The presence of the polysaccharide leads to non-specific competing dehydration and deacetylation reactions that form highly colored materials The elimination of water or acetic acid from the linear reduced oligosaccharide with the formation of double bonds in one of the glucoside units followed by elimination of a molecule of hydroxyacetaldehyde leads to the formation of a linear structure with conjugated double bonds. These colored compounds provide the off-yellow color (b*) in the SSP processed chip. The reactions of thermal degradation of cellulose triacetate, similar to that of cyclodextrin, are well known in the art. The presence of small amounts of acetic acid accelerates the degradation process described above. Based on the experimental data shown above, a second late-addition polyester batch was produced with acetyl beta cyclodextrin with low (60 ppm) residual acetic acid and the same degree of acetyl substitution. Two late-addition samples were produced—a control polyester and a polyester containing 0.25 wt.-% of acetyl beta cyclodextrin. The chip was exposed to SSP treatment in an identical manner as the earlier example and the materials were checked for IV, color and acetaldehyde content and the data is given below:

TABLE 6

Solid state polymerization rate and crystalline chip properties.

| Sample Description | SSP rate IV/hr | SSP'ed IV dl/g | CEG Mmole/kg | L* | b* | AA (ppm) |
|---|---|---|---|---|---|---|
| 1102 Control | 0.0130 | 0.830 | 15 | 60.0 | −7.0 | 0.34 |
| 0.25 wt % Triacetyl β-CD | 0.0123 | 0.844 | 15 | 57.1 | 5.9 | 0.59 |

The yellow color b* reported in Table 4 is 2.5 units greater than in Table 6. Although the lower initial acetic acid residual in the cyclodextrin provided an improvement in off-yellow color, any off-color is commercially undesirable. We found that after dissolving the crystalline chip and separating the low molecular weight materials (cyclodextrins and PET oligomers) from the PET polymer, and analyzing the low molecular weight fraction by MALDI-TOF/MS, the results showed the acetyl cyclodextrin transesterifies with the PET polymer during SSP. This reaction will produce acetic acid as a reaction product, catalyzing cyclodextrin degradation. The acetyl cyclodextrin derivative, when added late-addition and subjected to extended time (14 to 18 hours) at elevated temperature (210° C.) during solid state polymerization, can develop undesirable color in the crystalline chip caused by opening of the cyclodextrin ring with a loss of the glucosidic structure and build up of unsaturation. However, it has been shown that a thermally stable and compatible cyclodextrin derivative may be injected in the molten polyester in the late stage of polycondensation without producing off-color in the polyester.

Table 7 contains acetaldehyde (AA) reductions obtained on aqueous acetyl β-cyclodextrin coated commercial KoSa amorphous polycondensate PET pellets. Three acetyl β-cyclodextrin coating weights—0.10%, 0.15% and 0.20% were used. The 0.20% acetyl β cyclodextrin coating reduced AA by 52%, the other coating weights were less effective for reducing AA. Amorphous chip is coated with the aqueous cyclodextrin solutions to provide the cyclodextrin loading weight percent. An aqueous cyclodextrin coating solution (5 wt.-%) is prepared. An aliquot by weight of the coating solution is deposited into the center mass of resin chip contained in a glass jar (already having a tare weight). The amount of coating solution that is transferred is adjusted for the coating loss on the inside surface of the glass jar. The capped jar is rotated at approximately 30 rpm for 15 minutes on a jar roller mill to evenly distribute the cyclodextrin coating on the PET chips. Following coating, the chip is dried in a vacuum oven at 105° C. under 1 mm Hg for sixteen (16) hours. The dried chip is then molded and tested for acetaldehyde concentration in an Atlas mixer/molder at 270° C. for two minutes. The mixing is low shear and the melt is then injected from the mixing chamber after two minutes. A polyethylene terephthalate sample composite (three individual Atlas runs) was made from each sample, and then each sample was analyzed in triplicate. The resin mixing time in the molten state is important for optimum AA reduction. This suggests that some minimum amount of mixing time will be required in the injection molder melt phase when the preform is molded. The mixing/molding cycle time for commercial injection molding machines is typically from 2 to 3 minutes depending on the number of preform cavities and the injection cycle time.

TABLE 7

Acetyl β Cyclodextrin Coated Amorphous PET Pellets Molded in Atlas Laboratory Mixing/Molder

| Sample ID | AA (ppm) | STD. DEV. | % AA Reduction |
|---|---|---|---|
| Control PET | 8.4 | 0.156 | NA |
| 0.20 wt % acetyl β-CD[1] | 4.1 | 0.090 | 52 |
| 0.15 wt % acetyl β-CD[1] | 5.7 | 0.089 | 32 |
| 0.10 wt % acetyl β-CD[1] | 7.3 | 0.103 | 13 |

[1]Degree of acetyl substitution = 1.1
*Values reported are an average of three analyses
% AA Reduction = % acetaldehyde reduction relative to control Commercial PET bottle grade resin is SSP processed before it is used to injection mold preforms. The SSP process decreases AA and carboxyl end groups, and achieves the desired IV, thus improving the physical properties of the finished blown bottle. The PET pellets in Table 7 were dry-coated with acetyl β-cyclodextrin in a glass jar by tumbling to adhere the cyclodextrin powder to the pellets and then vacuum oven drying (105° C. @ 1 mm Hg pressure for 14 hours to eliminate residual PET moisture). Vacuum drying also lowers the pellet acetaldehyde concentration down to approximately 1 ppm. During vacuum drying, the high AA concentration in the non-SSP PET pellet diffuses out of the pellet and through the exterior CD coating. The dried-coated chip samples and control sample were run under identical drying conditions and then molded on an Atlas Molder Mixer for two (2) minutes at 270° C. The molded samples were collected cryogenically, cryogenically ground to 10 mesh or smaller and then analyzed by static headspace gas chromatography with flame ionization detection using a sample conditioning temperature of 150° C. for 90 minutes. This coating method demonstrates commercial application of the technology is achievable when large concentrations of AA are in the chip prior to CD coating and drying. An acetaldehyde concentration of about 4.1 ppm, a reduction of more than 50%, using an acetyl substituted beta-cyclodextrin (DS=1.1) was achieved.

In Table 8, PET pellets were coated with an aqueous solution of acetyl β-cyclodextrin and hydroxypropyl β-cyclodextrin. Initially, PET chips were coated with an aqueous CD solution and then vacuum dried for 14 hours at 120° C. and 2 mm Hg pressure. Following drying, the PET chips were extruded in a Killion single screw moderate shear extruder (PET melt temp. 282° C.). The PET residence time in the Killion extruder was approximately 30 seconds. After the extruder reached equilibrium running each sample, the extrudate was collected by cryogenically cooling with liquid nitrogen, grinding to 10 mesh, and then analyzing by static headspace gas chromatography for acetaldehyde (solid graphed results, see FIG. 3).

The single screw extrudate above was processed a second time in a laboratory-scale Atlas Mixing Molder. The single screw extrudate samples were prepared for molding on the Atlas by grinding to 10 mesh after being cryogenically cooled with liquid nitrogen, vacuum oven drying as described above to remove moisture and residual acetaldehyde, and then molded on an Atlas Molder Mixer for two (2) minutes at 270° C. to regenerate acetaldehyde. The molded samples were also collected cryogenically, cryogenically ground to 10 mesh and then analyzed by static headspace gas chromatography for acetaldehyde (pattern graphed results). All test samples were analyzed in triplicate.

TABLE 8

PET Acetaldehyde Concentration as a Function of Mixing Time and Shear

| Sample ID | Killion Extrudate (mixing time 30 sec) AA (ppm) | AA Reduction (%) | Atlas Molder Mixer (mixing time 120 sec) AA (ppm) | AA Reduction (%) |
|---|---|---|---|---|
| 0.20 wt % HO-propyl β-CD (DS = 0.65) | 15.8 | [6.0][1] | 8.51 | 6.5 |
| 0.10 wt % acetyl β-CD (DS = 1) | 14.8 | <0.01 | 4.05 | 55 |
| Control PET | 14.9 | NA | 9.10 | NA |

[1]Increase relative to control.

These data show dispersing CD at moderate shear and short residence time (about 30 sec. on the Killion extruder) is less effective in lowering acetaldehyde levels as compared to control while dispersing CD at low shear and longer residence time (120 seconds on the Atlas Molder Mixer) does substantially reduce acetaldehyde levels as compared to control. Both hydroxypropyl substituted β-cyclodextrin and acetyl substituted β-cyclodextrin can achieve reduced acetaldehyde levels when cyclodextrin coated chip is processed with longer residence times and low shear. In particular, achieving 55% acetaldehyde reduction after Atlas processing (i.e., low shear longer residence time) illustrates that commercial injection molding machines are ideally suited to process CD coated PET chip.

Using similar sample preparation techniques to those discussed above, additional experiments were conducted to evaluate AA reduction when the Atlas Molder Mixer, molding temperature and time are held constant but mixing speed was varied. Tables 9 and 10 show experimental data for two mixing speeds of 40 and 140 rpm. The best acetaldehyde reduction compared to the control in Table 9 reduced the acetaldehyde concentration from about 33 ppm to about 13 ppm at 40 rpm. In Table 10, at 140 RPM, substantial acetaldehyde reduction was also achieved. Holding molding temperature (275° C.) and time (2 min.) constant, then changing the low shear mixing speed (40 rpm vs. 140 rpm) does not significantly affect AA reductions obtained from various CD coated PET chips.

TABLE 9

Mean Acetaldehyde in PET resin Mixing Speed 40 rpm

| Sample Description | AA mean (ppm) | St. Dev. | AA Reduction (%) |
|---|---|---|---|
| 0.10 wt % HO-propyl β-CD | 20.1 | 0.77 | 39 |
| 0.20 wt % HO-propyl β-CD | 20.0 | 0.94 | 39 |
| 0.10 wt % acetyl β-CD | 14.9 | 0.30 | 55 |
| 0.20 wt % acetyl β-CD | 13.4 | 0.40 | 59 |
| Control | 33.0 | 0.99 | NA |

TABLE 10

Mean Acetaldehyde in PET Resin Mixing Speed 140 rpm

| Sample Description | AA mean (ppm) | St. Dev. | AA Reduction (%) |
|---|---|---|---|
| 0.10 wt % HO-propyl β-CD | 15.6 | 0.38 | 33 |
| 0.20 wt % HO-propyl β-CD | 21.0 | 0.45 | 9.5 |
| 0.10 wt % HO-propyl β-CD | 15.2 | 0.18 | 34 |
| 0.20 wt % acetyl β-CD | 12.9 | 0.35 | 44 |
| Control | 23.2 | 0.09 | NA |
| 0.15 wt % β-cyclodextrin (not substituted) | 23.4 | 0.11 | 26 |
| 0.1 wt % β-cyclodextrin (not substituted) | 22.4 | 0.47 | 30 |
| Control | 31.8 | 0.47 | NA |
| 0.05 wt % β-cyclodextrin (not substituted) | 20.6 | 0.53 | 39 |
| 0.15 wt % β-cyclodextrin (not substituted) | 20.9 | 0.91 | 39 |
| Control | 34/34 | 1/.6 | NA |

Figure 5:
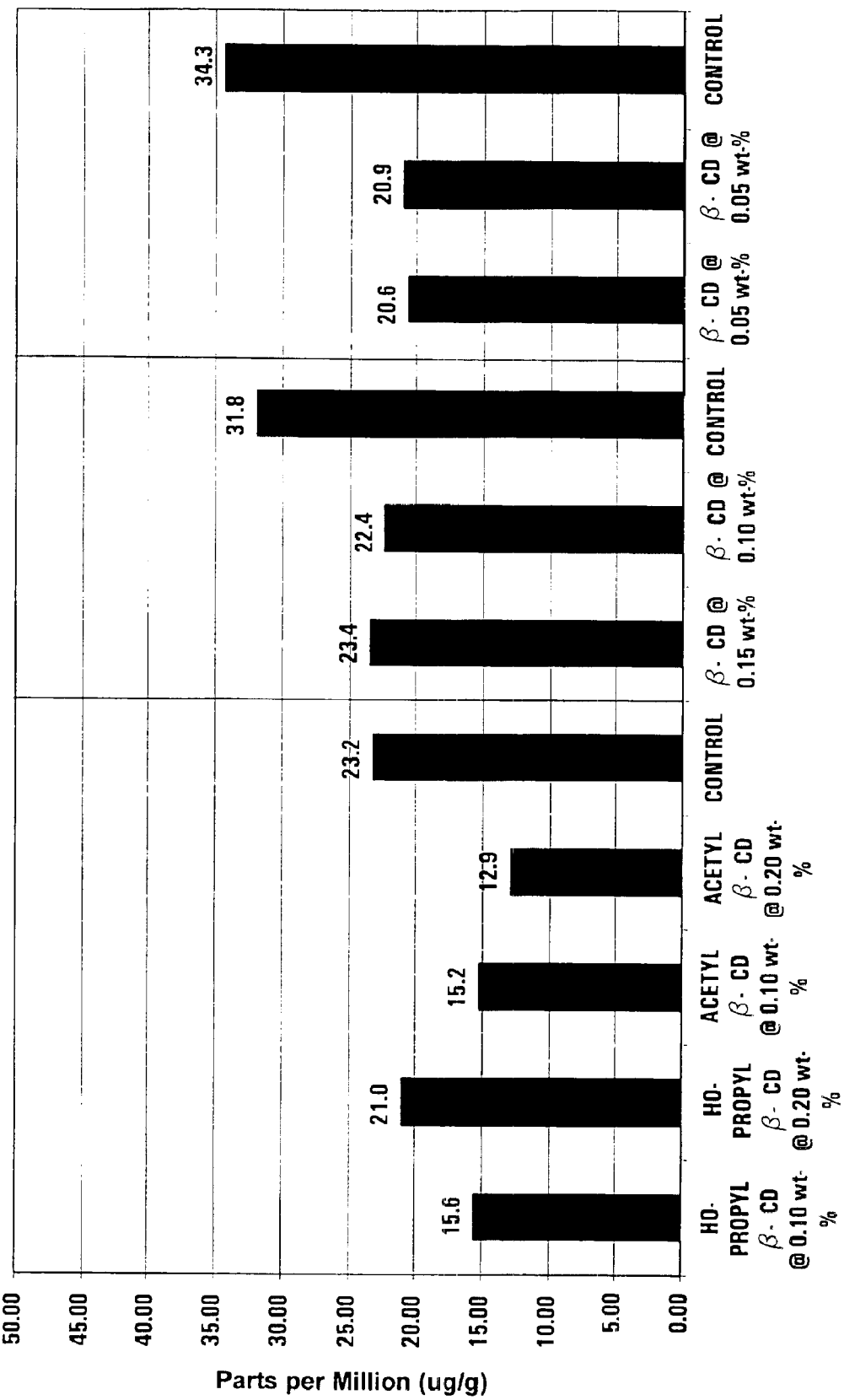
FIG. 5 is a bar graph representation of acetaldehyde reduction data demonstrating the importance of using controlled amounts of unsubstituted $\beta$-cyclodextrin in polyester resins.
Figure 6:
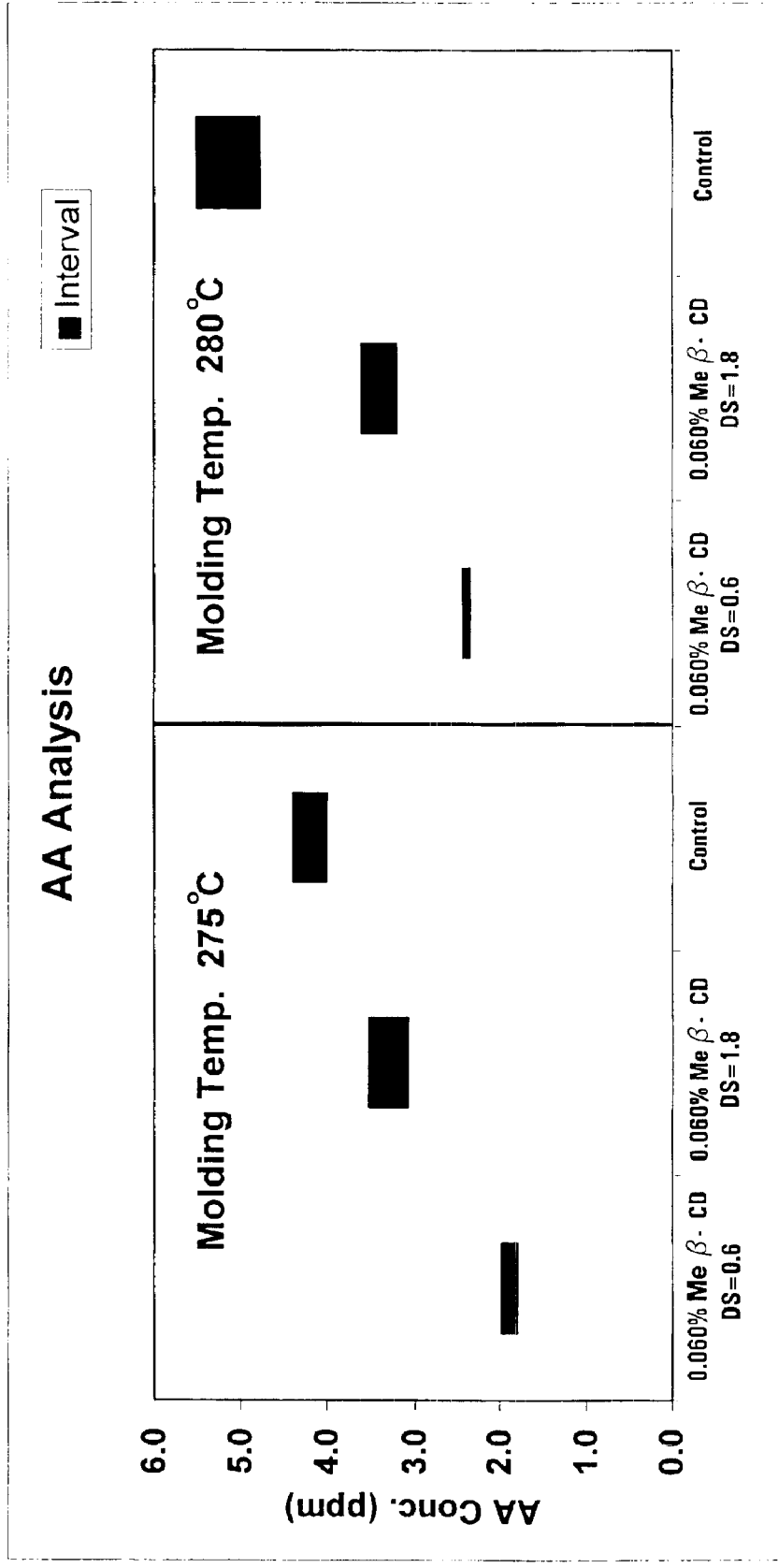
FIG. 6 is a bar graph representation of acetaldehyde reduction data demonstrating the importance of methyl ether substitution, methyl ether concentration and molding temperature.

These data are represented in bar graph form in FIG. 5.
All samples processed on an Atlas Lab Molder Mixer at 275° C. for 2 minutes.

In the following examples, two cyclodextrins (unmodified α-cyclodextrin and acetyl β-cyclodextrin DS=1.1) were coated onto a commercial resin, Polyclear 1101, obtained from KoSa. An aqueous cyclodextrin coating solution (5 wt.-%) is prepared.

An aliquot of the coating solution (measured by weight) is deposited into the center mass of 2.5 Kg of resin chip in a 1 gallon glass jar (already having a tare weight). The amount of coating solution that is transferred is adjusted for the coating loss on the inside surface of the glass jar. The capped jar is rotated at approximately 30 rpm for 15 minutes on a jar roller mill to evenly distribute the cyclodextrin coating on the PET chips. After the jar roller coating procedure, the jar cap is removed and the glass jar is placed into a vacuum oven operated at 130° C. at about 2 mm Hg for sixteen (16) hours to remove water from the coating procedure. The coated PET chip is removed and the jar is weighed; the exact chip coating weight is determined after determining the CD coating weight remaining on the jar's inside surface. The previously dried, coated chip samples and control were dried in an Arburg inline dryer at 175° C. for at least 4 hours. Each coated resin variable, along with a control, was injection molded (48 gram preforms) on the Arburg single-cavity injection-molding machine. Injection molding was carried out at 275° C. for all samples. Preform IV, color, and AA were measured in triplicate and the average value reported. Samples for AA analysis were removed from the center section of the perform. Preform samples were cryogenically ground to 10 mesh or smaller and then analyzed by static headspace gas chromatography with flame ionization detection using a sample conditioning temperature of 160° C. for 90 minutes. The preform data are summarized in Table 11.

TABLE 11

Arburg Injection Molded Preform Data Summary

| Type | Concentration | b* ave. | Haze | Preform IV (dl/g) | Preform AA (ppm) | AA Reduction (%) |
|---|---|---|---|---|---|---|
| 1101 Control | | 3.2 | clear | 0.784 | 7.9 | |
| α-cyclodextrin (unmodified) | 0.005 wt.-% | 3.8 | hazy | 0.783 | 7.2 | 8.9% |
| α-cyclodextrin (unmodified) | 0.015 wt.-% | 4.4 | hazy | 0.784 | 7.7 | 2.5% |
| acetyl β-CD (DS = 1.1) | 0.015 wt.-% | 6.0 | clear/yellow | 0.753 | 6.5 | 17.7% |
| acetyl β-CD (DS = 1.1) | 0.025 wt.-% | 6.8 | clear/yellow | 0.760 | 6.8 | 13.9% |
| acetyl β-CD (DS = 1.1) | 0.035 wt.-% | | clear/yellow | 0.743 | 5.5 | 30.4% |

% AA Reduction = % acetaldehyde reduction relative to control

The higher yellow b* values obtained from the acetyl derivative were caused from residual acetic acid, acetate and iron. The yellow color can be reduced by treating an aqueous solution of acetyl β cyclodextrin with activated charcoal to reduce the acetic acid and acetate concentration. The acetate and iron contaminants can effectively be removed by reverse osmosis or nanofiltration. Residual acetic acid is the principal contaminant responsible for producing high b* values. Unmodified α-cyclodetxrin causes haze in the injection molded polyester preform due to its incompatibility with the resin. Acetyl β (DS=1.1) reduced regenerated acetaldehyde more effectively than unmodified α-cyclodextrin. A concentration of 350 ppm of acetyl β-cyclodextrin reduced regenerated acetaldehyde 30.4%.

Based on the experimental data shown above, attention was focused on defining the preferred cyclodextrin substituent, the preferred concentration of substituted cyclodextrin in the polyester, and the preferred degree of substitution. A methyl ether substituent was selected as a model for other simple ether and ester substituents. Methylated beta cyclodextrin (Me β) materials were used in amounts of about 250 ppm, 500 ppm and 600 ppm. Aqueous solutions (4.8 wt-%) of Me β was coated onto KoSa 1101 chip with an IV of 0.83 dL/g to provide the appropriate CD coating weight. The coated chip was vacuum dried 14 hours at 140° C. Dried samples were then molded on an Atlas Molder Mixer for two (2) minutes at 275° C., 280° C. The molded samples were collected cryogenically, cryogenically ground to 10 mesh or smaller and then analyzed by static headspace gas chromatography with flame ionization detection using a sample conditioning temperature of 150° C. for 90 minutes. These experiments produced the following results shown below in Tables 12 and 13 and FIGS. 6 and 7.

TABLE 12

Comparision of Methyl Ether β-Cyclodextrin Substitution, Methyl Ether β-Cyclodextrin Concentration and Molding Temperature

| Sample ID | Molding Temp. ° C. | Acetaldehyde (ppm) | AA Ave. | Std. Dev. | AA Reduction (%) |
|---|---|---|---|---|---|
| 0.060 wt % Me β-CD DS = 0.6 | 275 275 275 | 1.92 1.93 1.78 | 1.88 | 0.082 | 55.2% |
| 0.060 wt % Me β-CD DS = 1.8 | 275 275 275 | 3.53 3.15 3.22 | 3.30 | 0.201 | 21.4% |
| 1101 PET Control | 275 275 | 4.39 4.11 4.08 | 4.19 | 0.166 | NA |
| 0.060 wt % Me β-CD | 280 280 | 2.41 2.40 | 2.39 | 0.032 | 53.5% |
| DS = 0.6 0.060 wt % Me β-CD DS = 1.8 | 280 280 280 | 2.35 3.19 3.52 3.48 | 3.40 | 0.180 | 33.8% |
| 1101 PET Control | 280 280 280 | 4.80 5.44 5.16 | 5.13 | 0.320 | NA |

TABLE 13

Comparision of Methyl Ether β-Cyclodextrin Substitution, Methyl Ether β-Cyclodextrin Concentration and Molding Temperature

| Sample ID | Molding Temp. ° C. | Acetaldehyde (ppm) | Ave. | Std. Dev. | % AA Reduction |
|---|---|---|---|---|---|
| 0.025 wt % Me β-CD DS = 0.6 | 275 275 275 | 2.51 2.53 2.36 | 2.46 | 0.093 | 27.1 |
| 0.025 wt % Me β-CD DS = 1.8 | 275 275 275 | 3.27 2.97 2.85 | 3.03 | 0.218 | 10.4% |
| 1101 PET Control | 275 275 275 | 3.59 3.45 3.114 | 3.38 | 0.243 | NA |
| 0.050 wt % Me β-CD DS = 0.6 | 275 275 275 | 2.35 2.50 2.19 | 2.35 | 0.154 | 44.5% |
| 0.050 wt % Me β-CD DS = 1.8 | 275 275 275 | 3.19 2.73 3.36 | 3.09 | 0.322 | 26.8% |
| 1101 PET Control | 275 275 275 | 4.01 4.31 4.36 | 4.23 | 0.189 | NA |

Figure 7:
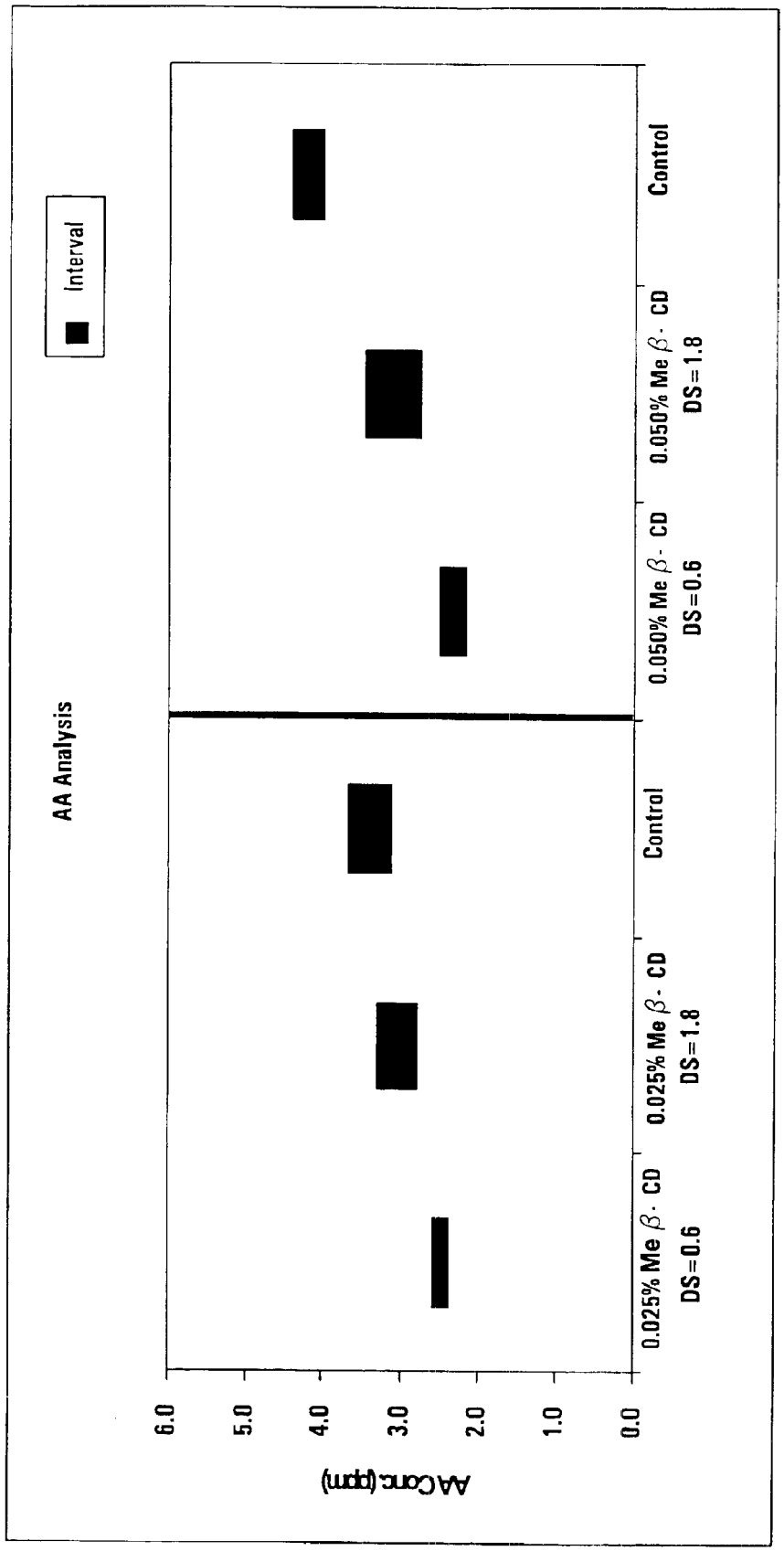
FIG. 7 is a bar graph representation of acetaldehyde reduction data demonstrating the importance of methyl ether substitution and methyl ether concentration.

These data are represented in bar graph form in FIG. 7.
% AA Reduction = % acetaldehyde reduction relative to control.

These data demonstrate that the use of a substituted cyclodextrin material with the correct degree of substitution, substituted substantially at the –6 —OH position, used at an appropriate concentration can achieve residual acetaldehyde levels substantially less than control uncoated chip. The most common stoichiometric ratio for cyclodextrin complexes is 1:1 or 2:1 (guest-acetaldehyde:host-cyclodextrin). Using this basis to calculate the theoretical acetaldehyde concentration (parts per million) reduction as a function of weight-% cyclodextrin loading (i.e., as a complex ratio of 1:1) in PET, a linear relationship can be established for both methylated cyclodextrin substitutions (DS=0.6 and DS=1.8). The theoretical relationships mathematically show that a given coating weight of Me β (DS=0.6) is more effective than the same coating weight of Me β (DS=1.8) for acetaldehyde removal due to the difference in molecular weights. Working with the 275° C. molding temperature experimental data in Tables 12 and 13, a second relationship between cyclodextrin loading and acetaldehyde can be calculated. On an experimental test basis, after weight normalizing one Me β cyclodextrin substitution molecular weight to the other Me β cyclodextrin substitution molecular weight (Me β (DS=1.8) has a greater molecular weight), experimentally Me β (DS=0.6) is >40% more effective than Me β (DS=1.8). In particular, achieving residual acetaldehyde levels between 2 and 3 ppm are a surprising result.

In the following examples, regenerated acetaldehyde concentrations were experimentally studied in two different bottle grade PET resins (KoSa Polyclear 1101 and 3301). PET resin 1101 is a higher molecular weight (IV of 0.83 dL/g) resin than the 3301 (IV of 0.75 dL/g) resin. By wavelength dispersive x-ray fluorescence, 1101 and 3301 show antimony concentrations of 317 ppm and 264 ppm, respectively. In this experiment, the two bottle grade resins were aqueous coated with similar weights of two Me β cyclodextrins (DS=0.6 and DS=1.8) and molded at three different temperatures. Following coating, the chip was vacuum dried at 120° C. under 1 mm Hg for 14 hours resulting in 500 to 600 ppm cyclodextrin in the polyester. The dried coated chip samples and control sample run under identical drying conditions were molded on an Atlas Molder Mixer for two (2) minutes at 270° C., 275° C. and 280° C. The molded samples were collected cryogenically, cryogenically ground to 10 mesh or smaller and then analyzed by static headspace gas chromatography with flame ionization detection using a sample conditioning temperature of 150° C. for 90 minutes. Table 14 shows residual acetaldehyde concentration (average of three replicates) as a function of resin type, molding temperature and degree of substitution.

TABLE 14

Comparision of Methyl Ether β-Cyclodextrin Substitution, Molding Temperature and Resin Grade.

| | Acetaldehyde (ppm) Molding Temp/Resin: | | | |
|---|---|---|---|---|
| | 270° C./ 3301 | 275° C./ 1101 | 280° C./ 3301 | 280° C./ 1101 |
| Me β-CD, DS = 0.6 | 1.88 | 1.93 | 2.45 | 2.39 |
| Me β-CD, DS = 1.8 | 2.68 | 3.19 | 3.21 | 3.50 |
| Control | 3.27 | 4.22 | 4.37 | 5.30 |

| | Percent AA Reduction Molding Temp/Resin: | | | |
|---|---|---|---|---|
| | 270° C./ | 275° C./ | 280° C./ | 280° C./ |

TABLE 14-continued

Comparision of Methyl Ether β-Cyclodextrin Substitution, Molding Temperature and Resin Grade.

| | 3301 | 1101 | 3301 | 1101 |
|---|---|---|---|---|
| Me β-CD, DS = 0.6 | 42.7% | 54.4% | 42.9% | 54.9% |
| Me β-CD, DS = 1.8 | 18.2% | 24.5% | 26.6% | 33.9% |

| | Measured CD Coating Weight on Chip (ppm) Molding Temp/Resin: | | | |
|---|---|---|---|---|
| | 270° C./ 3301 | 275° C./ 1101 | 280° C./ 3301 | 280° C./ 1101 |
| Me β-CD, DS = 0.6 | 600 | 550 | 600 | 550 |
| Me β-CD, DS = 1.8 | 560 | 680 | 560 | 680 |

% AA Reduction = % acetaldehyde reduction relative to control.

Bottle resin 1101 and 3301 produce different concentrations of acetaldehyde (1101 is greater than 3301) at a given temperature, but achieve almost identical levels of regenerated acetaldehyde when coated with Me β (DS=0.6) and molded. The percent (%) acetaldehyde reduction by Me β DS=0.6 is dependent on the initially acetaldehyde concentration generated by the resin at a specific temperature. This is illustrated when comparing 1101 and 3301 resins with and without a CD coating run at 280° C. Resin 1101 generates greater acetaldehyde than 3301 when injection molded at a given temperature, but both resins coated with Me β DS=0.6 are reduced to the same acetaldehyde concentration. Higher injection molding temperatures impact acetaldehyde generation more in uncoated CD chip than coated chip. The percent (%) AA reduction is greater for a given resin at higher injection molding temperatures than at lower injection temperatures.

In the following examples, three cyclodextrin derivatives were coated onto KoSa 3301 PET chip as described previously. Acetyl β and Me β (DS=1.8) were treated with activated charcoal to remove color-causing impurities, and ME β (DS=0.6) was treated with Dowex SD-2 to remove color-causing impurities. Each coated sample and control pair was dried in an Arburg inline dryer at 175° C. for at least 4 hours. Each coated resin variable along with a control was injection molded (48 gram preforms) on the Arburg single-cavity injection-molding machine. Injection molding was carried out at 270° C. for all samples. Preform IV, color, haze, and AA were measured in triplicate and the average value reported. Samples for AA analysis were removed from the center of the preform. Preform samples were cryogenically ground to 10 mesh or smaller and then analyzed by static headspace gas chromatography with flame ionization detection using a sample conditioning temperature of 160° C. for 90 minutes. The preform data are summarized in Table 15.

TABLE 15

Arburg Injection Molded Preform Data Summary

| Type | Concentration | b* ave. | Haze ave. (%) | Preform IV (dl/g) | Preform AA (ppm) | AA Reduction (%) |
|---|---|---|---|---|---|---|
| 3301 Control | — | 1.6 | 21.5 | 0.732 | 3.6 | 24.3% |
| acetyl β-CD, (DS 1.1) | 0.05 wt.-% | 5.3 | 22.8 | 0.726 | 2.7 | |
| 3301 Control | — | 1.7 | 22.0 | 0.736 | 4.3 | 33.6% |
| Me β-CD, (DS 0.6) | 0.06 wt.-% | 4.5 | 45.9 | 0.722 | 2.8 | |

TABLE 15-continued

Arburg Injection Molded Preform Data Summary

| Type | Concentration | b* ave. | Haze ave. (%) | Preform IV (dl/g) | Preform AA (ppm) | AA Reduction (%) |
|---|---|---|---|---|---|---|
| 3301 Control | — | 1.6 | 22.7 | 0.733 | 4.3 | 20.8% |
| Me β-CD (DS 1.8) | 0.06 wt.-% | 2.7 | 22.4 | 0.728 | 3.4 | |

% AA Reduction = % acetaldehyde reduction relative to control.

Me β(DS=0.6) reduced regenerated acetaldehyde more effectively than either the Me β(DS=1.8) and acetyl CD derivative. The high haze value (45.9) produced by Me β (DS=0.6) was traced to a contaminant that was inadvertently introduced into the material. Me β (DS=1.8) produced the best haze, b* and IV results compared to the other derivatives.

In the following examples, two different degrees of methylated substituted cyclodextrins were coated onto KoSa 3301 PET chip as described previously. Me β (DS=0.6) and Me β (DS=1.8) were treated with activated charcoal to remove color-causing impurities. The control 3301 and cyclodextrin-coated samples were dried in a vacuum dryer at 140° C. for at 6 hours before injection molding. Each coated resin variable, along with the control, was injection molded (50.5 gram preforms) on Nissei ASB 250 injection-molding machine. The injection molder barrel zone temperature (setting and actual) profiles are provided in Table 16. Preform IV, b*, and AA were measured in triplicate and the average value reported. Samples for AA analysis were removed from the ring of the preform. Preform samples were cryogenically ground to 10 mesh or smaller and then analyzed by sample gas chromatography with flame ionization detection using a sample conditioning temperature of 160° C. for 90 minutes.

The preform data are summarized in Table 16:

TABLE 16

Nissei ASB 250 Injection Molded Preform Data Summary

| Examples | Extruder Zone Setting 1/2/3 (° C.) | Extruder Zone Actual 1/2/3 (° C.) | b* ave. | Preform IV (dl/g) | Preform AA (ppm) | AA Reduction (%) |
|---|---|---|---|---|---|---|
| KoSa PET 3301 (Control) | 245/240/240 | 258/240/240 | 0.90 | 0.76 | 1.8 | — |
| KoSa PET 3301 with 0.09% Me β-CD, (DS = 0.6) | 245/240/240 | 253/240/240 | 4.96 | 0.74 | 1.3 | 27.8% |
| KoSa PET 3301 with 0.12% Me β-CD, (DS = 1.8) | 245/240/240 | 253/240/240 | 2.11 | 0.74 | 1.3 | 27.8% |

% AA Reduction = % acetaldehyde reduction relative to control.

A lower coating weight (0.09%) of Me β (DS=0.6) reduced regenerated acetaldehyde to the same level as a higher coating weight (0.12%) of Me β (DS=1.8). Me β (DS=0.6) had a higher b* off yellow color and was visually hazy compared to the Me β (DS=1.8) and 3301 control. The off-color and haze is related to the smaller number of methyl ether functional groups on the cyclodextrin providing a higher melting point and less compatibility with the polyester. Both methylated cyclodextrin derivatives reduced (5° C. reduction) actual extruder zone 1 temperatures compare to the 3301 control polyester. The measured polyester resin injection melt temperature was reduced by 4° C. for both of the Me □coated chip samples relative to the uncoated chip control. Me β (DS=1.8) coated chip preform produced a clear, low yellow b* value and slightly lower IV than the 3301 control.

The above explanation of the nature of the cyclodextrin compounds, the thermoplastic polyester material, the pellet or chip, the parison or preform, the beverage container and methods of making the beverage container provide sufficient manufacturing details to provide a basis for understanding the technology involving incorporating the cyclodextrin material in a polyester thermoplastic for the purpose of organic compound scavenging and barrier purposes. However, since many embodiments of the invention can be made without departing from the spirit and scope of the invention, the invention resides in the claims hereinafter appended.

We claim:

1. A thermoplastic polyester preform comprising a thermoplastic polyester and a substituted cyclodextrin compound, the preform comprising about 100 parts by weight to 1400 parts by weight of the substituted cyclodextrin compound per each one million parts of polyester resin, the substituted cyclodextrin having a degree of substitution of about 0.3 to 1.8; wherein the cyclodextrin is substantially free of any compound in the central pore of the cyclodextrin ring and the cyclodextrin is present in an effective amount to complex catalyst residue.

2. The preform of claim 1 wherein the polyester comprises at least 60% by weight polyethylene terephthalate units and up to 40% by weight other polymers.

3. The chip of claim 1 wherein the polyester comprises at least 60% by weight polyethylene naphthalate units and up to 40% by weight other polymers.

4. The chip of claim 1 wherein the polyester comprises a copolymer of polyethylene terephthalate/isophthalate and the cyclodextrin is a non-reducing carbohydrate.

5. The proform of claim 1 wherein the cyclodextrin compound has a substituent substantially on at least one —OH group on the –6 position of the glucose moiety in the cyclodextrin.

6. The preform of claim 5 wherein the cyclodextrin compound comprises a 6-O-Methyl ether.

7. The preform of claim 5 wherein the cyclodextrin compound comprises a 6-O Acetyl ester.

8. The preform of claim 5 wherein the cyclodextrin compound comprises a degree of substitution of about 0.5 to 1.2 in on amount of about 350 parts by weight to about 900 parts by weight of the cyclodextrin compound per each one million parts of polyester resin.

9. A thermoplastic polyester beverage container comprising a thermoplastic polyester and a substituted cyclodextrin compound, the container comprising about 100 parts by weight to 1400 parts by weight of the substituted cyclodextrin compound per each one million parts of polyester resin, the substituted cyclodextrin having a degree of substitution of about 0.5 to 1.8; wherein the cyclodextrin is substantially free of any compound in the central pore of the cyclodextrin ring and the cyclodextrin is present in an effective amount to complex catalyst residue.

10. The container of claim 9 wherein the polyester comprises at least 60% by weight polyethylene terephthalate units and up to 40% by weight other polymers.

11. The container of claim 9 wherein the polyester comprises at least 60% by weight polyethylene naphthalate units and up to 40% by weight other polymers.

12. The chip of claim 9 wherein the polyester comprises a copolymer of polyethylene terephthalate/isophthalate and the cyclodextrin is a non-reducing carbohydrate.

13. The container of claim 9 wherein the cyclodextrin compound has a substituent substantially on at least one —OH group on the −6 position of the glucose moiety in the cyclodextrin.

14. The container of claim 13 wherein the cyclodextrin compound comprises a 6-O-Methyl.

15. The container of claim 13 wherein the cyclodextrin compound comprises a 6-O Acetyl ester.

16. The container of claim 9 wherein the cyclodextrin compound comprises a degree of substitution of about 0.5 to 1.2 in an amount of about 350 parts by weight to about 900 parts by weight of the cyclodextrin compound per each one million parts of polyester resin.

* * * * *